US012020636B2

(12) United States Patent
Zhang et al.

(10) Patent No.: US 12,020,636 B2
(45) Date of Patent: Jun. 25, 2024

(54) DISPLAY PANEL AND DISPLAY DEVICE

(71) Applicants: WUHAN TIANMA MICRO-ELECTRONICS CO., LTD., Wuhan (CN); Wuhan Tianma Microelectronics Co., Ltd. Shanghai Branch, Shanghai (CN)

(72) Inventors: Lin Zhang, Wuhan (CN); Xian Chen, Wuhan (CN)

(73) Assignees: WuHan TianMa Micro-electronics Co., Ltd, Wuhan (CN); Wuhan Tianma Microelectronics Co., Ltd. Shanghai Branch, Shanghai (CN)

( * ) Notice: Subject to any disclaimer, the term of this patent is extended or adjusted under 35 U.S.C. 154(b) by 0 days.

(21) Appl. No.: 18/326,545

(22) Filed: May 31, 2023

(65) Prior Publication Data

US 2023/0326402 A1 Oct. 12, 2023

(30) Foreign Application Priority Data

Dec. 27, 2022 (CN) ......................... 202211689960.4

(51) Int. Cl.
*G09G 3/32* (2016.01)

(52) U.S. Cl.
CPC ....... *G09G 3/32* (2013.01); *G09G 2300/0426* (2013.01); *G09G 2320/0242* (2013.01)

(58) Field of Classification Search
CPC ................... G09G 3/32; G09G 3/3233; G09G 2300/0819; G09G 2300/0861; G09G 2300/0426; G09G 2320/0257; G09G 2310/0251; G09G 2320/0223; G09G 2300/0452; G09G 2320/0242
See application file for complete search history.

(56) References Cited

U.S. PATENT DOCUMENTS

| | | | | |
|---|---|---|---|---|
| 10,614,740 | B2 * | 4/2020 | Lee | H10K 59/1213 |
| 10,615,244 | B2 * | 4/2020 | Hou | G09G 3/3258 |
| 10,777,161 | B2 * | 9/2020 | Xu | G09G 3/3688 |
| 10,802,365 | B2 * | 10/2020 | Wang | G11C 19/28 |
| 10,818,257 | B2 * | 10/2020 | Kim | G09G 3/3648 |
| 11,107,871 | B2 * | 8/2021 | Zeng | H10K 59/353 |
| 11,200,847 | B2 * | 12/2021 | Xiong | G09G 3/3266 |
| 11,322,095 | B1 * | 5/2022 | Zhuang | G09G 3/3266 |

(Continued)

*Primary Examiner* — Vinh T Lam
(74) *Attorney, Agent, or Firm* — CHRISTENSEN O'CONNOR JOHNSON KINDNESS PLLC

(57) ABSTRACT

A display panel including pixel circuits each including a drive transistor and a first reset transistor; first signal line including an indirect-connection signal line and a direct-connection signal line; connection signal lines, at least part of which is electrically connected to the indirect-connection signal lines; anodes; a pixel circuit group including two pixel circuits at least partially symmetric and adjacent, the first reset transistors of two pixel circuits being adjacent to each other, and adjacent first reset transistors being connected through a first semiconductor connection line, which is connected to the reset signal line; and pixel columns, two sides of the drive transistors in a pixel column being provided with two first signal lines and two second connection signal lines. At least part of the anodes overlaps with adjacent first signal lines and/or two adjacent second connection signal lines.

20 Claims, 33 Drawing Sheets

(56) References Cited

U.S. PATENT DOCUMENTS

| | | | | |
|---|---|---|---|---|
| 11,322,109 | B2 * | 5/2022 | Kim | G02F 1/13454 |
| 11,355,535 | B2 * | 6/2022 | Wang | G09G 3/32 |
| 11,393,408 | B2 * | 7/2022 | Li | G09G 3/3225 |
| 11,444,143 | B2 * | 9/2022 | Zeng | G09G 3/3233 |
| 11,475,849 | B1 * | 10/2022 | Qiao | G09G 3/32 |
| 11,508,291 | B2 * | 11/2022 | Cao | G09G 3/3233 |
| 11,550,424 | B2 * | 1/2023 | Lu | H10K 59/40 |
| 11,574,992 | B2 * | 2/2023 | Ma | H10K 59/1315 |
| 11,580,895 | B1 * | 2/2023 | Zou | G09G 3/32 |
| 11,663,952 | B2 * | 5/2023 | Kim | G09G 3/2074 345/690 |
| 11,683,957 | B2 * | 6/2023 | Zhou | G09G 3/3233 345/204 |
| 11,694,586 | B2 * | 7/2023 | Pan | G09G 3/20 345/205 |
| 11,721,265 | B1 * | 8/2023 | Ma | G09G 3/3291 345/204 |
| 11,735,131 | B2 * | 8/2023 | Yamazaki | H01L 29/66969 345/209 |
| 11,751,450 | B2 * | 9/2023 | Shang | H10K 59/131 |
| 11,798,468 | B2 * | 10/2023 | Cao | G09G 3/3233 |
| 2019/0206961 | A1 * | 7/2019 | Kim | H10K 59/131 |
| 2019/0261512 | A1 * | 8/2019 | Huang | H05K 1/115 |
| 2021/0384289 | A1 * | 12/2021 | Li | H10K 59/121 |
| 2022/0077265 | A1 * | 3/2022 | Ma | H10K 59/1213 |
| 2022/0208130 | A1 * | 6/2022 | Park | G09G 3/3266 |
| 2022/0302238 | A1 * | 9/2022 | Zhou | H10K 59/131 |
| 2022/0310015 | A1 * | 9/2022 | Wang | G09G 3/3233 |
| 2022/0392964 | A1 * | 12/2022 | Wu | H10K 59/65 |
| 2023/0061191 | A1 * | 3/2023 | Oh | G09G 3/3291 |
| 2023/0209892 | A1 * | 6/2023 | Kim | G09G 3/32 257/40 |
| 2023/0306904 | A1 * | 9/2023 | Huang | H10K 59/131 |
| 2023/0354659 | A1 * | 11/2023 | Jung | H10K 59/123 |
| 2024/0046828 | A1 * | 2/2024 | Oh | G09G 3/2003 |
| 2024/0046873 | A1 * | 2/2024 | Roh | G09G 3/3233 |

* cited by examiner

DISPLAY PANEL AND DISPLAY DEVICE

CROSS-REFERENCE TO RELATED APPLICATIONS

The present application claims priority to Chinese Patent Application No. 202211689960.4, filed on Dec. 27, 2022, the content of which is incorporated herein by reference in its entirety.

TECHNICAL FIELD

The present disclosure relates to the technical field of display, and in particular, to a display panel and a display device.

BACKGROUND

In conventional display panels, there is a need to introduce new connection lines into a display region to achieve a particular function. For example, data lines at two sides of the display region may be led to the middle of the display region through the connection lines. In this way, in design of fan-out lines, the fan-out lines are only required to be concentrated in a region directly facing a driver chip, so that a purpose of reducing a width of a corner bezel can be achieved.

However, after the introduction of the connection lines into the display region, the connection lines may affect light transmittance of the display panel and may also affect flatness of an anode in a light-emitting element, resulting in adverse problems such as color shift on the display panel.

SUMMARY

In view of the above, some embodiments of the present disclosure provide a display panel and a display device, which can optimize layout design of the display panel, thereby improving light transmittance and anode flatness of the display panel.

In an aspect, some embodiments of the present disclosure provide a display panel, having a display region and including pixel circuits located in the display region, each of the pixel circuits including a drive transistor and a first reset transistor that is electrically connected to a reset signal line; first signal lines located in the display region, the first signal lines including an indirect-connection signal line and a direct-connection signal line; connection signal lines located in the display region, at least part of the connection signal lines being electrically connected to the indirect-connection signal line, the connection signal lines including a first connection signal line extending along a first direction and a second connection signal line extending along a second direction, the second direction intersecting the first direction; light-emitting elements located in the display region, each of the light-emitting elements including an anode; a pixel circuit group, the pixel circuit group including two pixel circuits at least partially symmetric with and adjacent to each other, and the first reset transistors of the two pixel circuits in the pixel circuit group being adjacent to each other and being connected to each other through a first semiconductor connection line, the first semiconductor connection line being connected to the reset signal line; and pixel columns arranged along the first direction, each pixel column of the pixel columns including pixel circuits arranged along the second direction, two sides of the drive transistors in one pixel column of the pixel columns in the first direction being provided with two first signal lines and two second connection signal lines, and in a direction perpendicular to a plane where the display panel is located, at least one of the anodes overlapping with two adjacent first signal lines, or at least one of the anodes overlapping with two adjacent second connection signal lines, or at least one of the anodes overlapping with two adjacent first signal lines while at least another one of the anodes overlapping with two adjacent second connection signal lines.

In another aspect, some embodiments of the present disclosure provide a display device, including a display panel. The display panel has a display region and includes: pixel circuits located in the display region, each of the pixel circuits including a drive transistor and a first reset transistor that is electrically connected to a reset signal line; first signal lines located in the display region, the first signal lines including an indirect-connection signal line and a direct-connection signal line; connection signal lines located in the display region, at least part of the connection signal lines being electrically connected to the indirect-connection signal line, the connection signal lines including a first connection signal line extending along a first direction and a second connection signal line extending along a second direction, the second direction intersecting the first direction; light-emitting elements located in the display region, each of the light-emitting elements including an anode; a pixel circuit group, the pixel circuit group including two pixel circuits at least partially symmetric with and adjacent to each other, and the first reset transistors of the two pixel circuits in the pixel circuit group being adjacent to each other and being connected to each other through a first semiconductor connection line, the first semiconductor connection line being connected to the reset signal line; and pixel columns arranged along the first direction, each pixel column of the pixel columns including pixel circuits arranged along the second direction, two sides of the drive transistors in one pixel column of the pixel columns in the first direction being provided with two first signal lines and two second connection signal lines, and in a direction perpendicular to a plane where the display panel is located, at least one of the anodes overlapping with two adjacent first signal lines, and/or at least another one of the anodes overlapping with two adjacent second connection signal lines.

BRIEF DESCRIPTION OF DRAWINGS

In order to better illustrate the technical solutions in the embodiments of the present disclosure, the accompanying drawings used in the description of the embodiments will be briefly introduced below. It is apparent that the accompanying drawings in the following description are merely some embodiments of the present disclosure, and other drawings can be obtained by those of ordinary skill in the art from the provided drawings without creative efforts.

DESCRIPTION OF EMBODIMENTS

In order to better illustrate the technical solutions of the present disclosure, the embodiments of the present disclosure will be described in detail below with reference to the accompanying drawings.

It should be made clear that the described embodiments are merely some of rather than all of the embodiments of the present disclosure. All other embodiments acquired by those of ordinary skill in the art without creative efforts based on the embodiments in the present disclosure fall within a protection scope of the present disclosure.

The terms used in the embodiments of the present disclosure are for the purpose of describing particular embodiments only and are not intended to limit the present disclosure. As used in the embodiments of the present disclosure and the appended claims, the singular forms of "a/an", "the", and "said" are intended to include plural forms, unless otherwise clearly specified in the context.

It should be understood that the term "and/or" used herein is merely an association relationship describing associated objects, indicating that three relationships may exist. For example, A and/or B indicates that there are three cases of A alone, A and B together, and B alone. In addition, the character "/" herein generally means that associated objects before and after it are in an "or" relationship.

Figure 1:
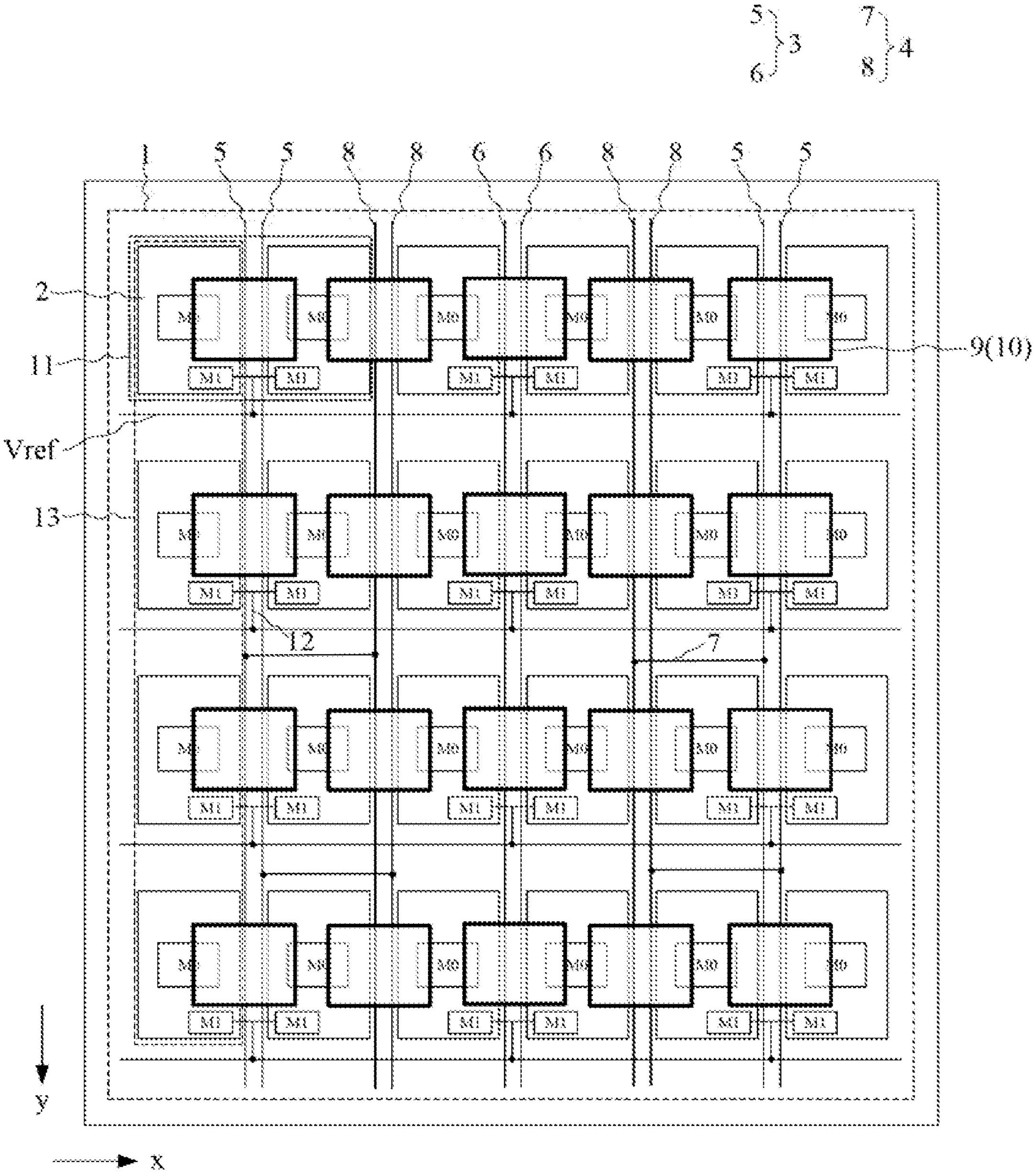
FIG. 1 is a schematic structural diagram of a display panel according to some embodiments of the present disclosure.

Some embodiments of the present disclosure provide a display panel. As shown in FIG. 1, FIG. 1 is a schematic structural diagram of a display panel according to some embodiments of the present disclosure. The display panel has a display region 1, and includes pixel circuits 2, first signal lines 3, connection signal lines 4, and light-emitting elements 9.

The pixel circuits 2 are located in the display region 1. The pixel circuits 2 each include a drive transistor M0 and a first reset transistor M1 electrically connected to a reset signal line $V_{ref}$.

The first signal lines 3 are located in the display region 1. The first signal lines 3 may be electrically connected to the pixel circuits 2 to transmit signals required for displaying to the pixel circuits 2. The first signal lines 3 each include an indirect-connection signal line 5 and a direct-connection signal line 6.

The connection signal lines 4 are located in the display region 1. At least part of the connection signal lines 4 are electrically connected to the indirect-connection signal lines 5. In one arrangement, the direct-connection signal lines 6 are directly electrically connected to fan-out lines in a bezel region, and the indirect-connection signal lines 5 are indirectly electrically connected to the fan-out lines in the bezel region through the connection signal lines 4. The connection signal lines 4 include first connection signal lines 7 each extending along a first direction x and second connection signal lines 8 each extending along a second direction y. The second direction y intersects the first direction x. It is to be noted that, in some embodiments of the present disclosure, the indirect-connection signal lines 5 may only have a connection relationship with one first connection signal line 7 and one second connection signal line 8 or may have a connection relationship with at least two first connection signal lines 7 and at least two second connection signal lines 8.

The light-emitting elements 9 are located in the display region 1. The light-emitting elements 9 include anodes 10, which are electrically connected to the pixel circuits 2 and configured to receive driving currents provided by the pixel circuits 2 to realize normal light emission of the light-emitting elements 9.

In addition, referring to FIG. 1 again, the display panel further includes pixel circuit groups 11. The pixel circuit groups 11 each include two pixel circuits 2 at least partially symmetric and adjacent to each other. The first reset transistors M1 of the pair of pixel circuits 2 in the pixel circuit group 11 are adjacent to each other. The adjacent first reset transistors M1 are connected to each other through a first semiconductor connection line 12. The first semiconductor connection line 12 is connected to the reset signal line $V_{ref}$.

The display panel further includes a plurality of pixel columns 13 arranged along the first direction x. The pixel columns 13 each include a plurality of pixel circuits 2 arranged along the second direction y. Each of two sides of each of the drive transistors M0 in the pixel column 13 is provided with two first signal lines 3 and two second connection signal lines 8. That is, if two adjacent first signal lines 3 are regarded as a first wiring group and two adjacent second connection signal lines 8 are regarded as a second wiring group, then the first wiring group and the second wiring group are arranged alternately. In a direction perpendicular to a plane where the display panel is located, at least some of the anodes 10 overlap with two adjacent first signal lines 3, and/or at least some of the anodes 10 overlap with two adjacent second connection signal lines 8.

In the related design, the pixel circuits 2 in the display region 1 are all designed in a uniform direction. In such a configuration, the first reset transistor M1 in each pixel circuit 2 is all located on a same side of the pixel circuit 2. As a result, the first reset transistors M1 in two adjacent pixel circuits 2 are far apart from each other, and the first reset transistors M1 in the pixel circuits 2 need to be led to the reset signal lines $V_{ref}$ through semiconductor connection lines and connected to the reset signal lines $V_{ref}$ through via-holes.

In some embodiments of the present disclosure, two adjacent pixel circuits 2 are designed to be at least partially symmetric to each other to enable the first reset transistors M1 in the two adjacent pixel circuits 2 to be arranged close to each other and adjacent to each other. Then, the two adjacent first reset transistors M1 can be connected to each other through a shorter first semiconductor connection line 12, which is connected to the reset signal line $V_{ref}$ through a via-hole, thereby realizing the connection between the two first reset transistors M1 and the reset signal line $V_{ref}$. With such a configuration, the first reset transistors M1 can share a via-hole, so a number of via-holes between the first reset transistors M1 and the reset signal lines $V_{ref}$ can be greatly reduced.

It is to be noted that reduction of the number of connection via-holes may increase connection resistance, resulting in an increase in voltage drop. However, a reset voltage is applied to the pixel circuit 2 according to rows, for example, applied in rows one by one or two by two in turn. Whether gates of the drive transistors M0 are reset by the reset voltage to charge a storage capacitor C or the anodes 10 of the light-emitting elements 9 are reset by the reset voltage to charge capacitors of the light-emitting elements 9, this charging current is smaller than light-emitting currents of the light-emitting elements 9, so the voltage drop is also small. Moreover, the voltage drop only affects signal levels of the resetting and does not affect the light-emitting current, so brightness of the light-emitting elements 9 is not affected, and it has almost no influence on a display effect.

In addition, in the related design, when the connection lines are introduced into the display region 1 to reduce winding of a bezel region, a light transmission area of the display region 1 may be greatly reduced, which affects under-screen optical sensors such as an ambient light sensor (ALS) and a fingerprint on display (FOD). As a result, the technology cannot meet customers' specification requirements. However, according to the design in the present disclosure, even if connection signal lines 4 are introduced into the display region 1, a light transmission area released by the reduced via-holes can be utilized to compensate for an area blocked due to the introduction of the connection signal lines 4, so that the display panel still maintains high light transmittance. When a backlight side of the display panel is provided with an under-screen optical sensor, ambient light intensity detected by a photosensitive element can be increased, thereby helping to optimize effects of some auxiliary functions such as camera and fingerprint recognition.

In addition, in the related design, after the introduction of the connection signal lines 4 into the display panel, the first signal lines 3 and the second connection signal lines 8 in the connection signal lines 4 are generally arranged alternately. That is, one first connection signal line 7 and one second connection signal line 8 are arranged between the drive transistors M0 of two adjacent pixel columns 13. In this case, in the design of the anodes 10 in the light-emitting elements 9, at least part of the anodes 10 may simultaneously overlap with one first connection signal line 7 and one second connection signal line 8. Due to different functions of the first signal line 3 and the second connection signal line 8, the two may be different in layer thickness and line width, or different in a need to be connected to a via-hole. For example, if the anode 10 overlaps with one direct-connection signal line 7 and one second connection signal line 8, since the direct-connection signal line 6 is not required to be connected to the connection signal line 4 through a via-hole and the second connection signal line 8 may be required to be connected to the first connection signal line 7 through a via-hole, the anode 10 may overlap with only one via-hole. As a result, the via-hole may raise the anode 10 locally in a small area, thereby resulting in a non-flat surface of the anode 10.

Therefore, in some embodiments of the present disclosure, through further adjustment of the arrangement of the first signal lines 3 and the second connection signal lines 8, either two first connection signal lines 7 or two second connection signal lines 8 are arranged between the drive transistors M0 of two adjacent pixel columns 13. In this way, when at least part of the anodes 10 is located between two adjacent pixel columns 13, the anode may overlap with two first signal lines 3 of a same type or overlap with two second connection signal lines 8 of a same type, thereby alleviating the problem of layer non-flatness caused by the overlapping of the anode 10 with different types of signal lines. After the flatness of the film layer of the anode 10 is improved, a difference in amounts of light emitted by the light-emitting element 9 at different angles is reduced, which can effectively weaken color shift and improve a visual effect.

Figure 2:
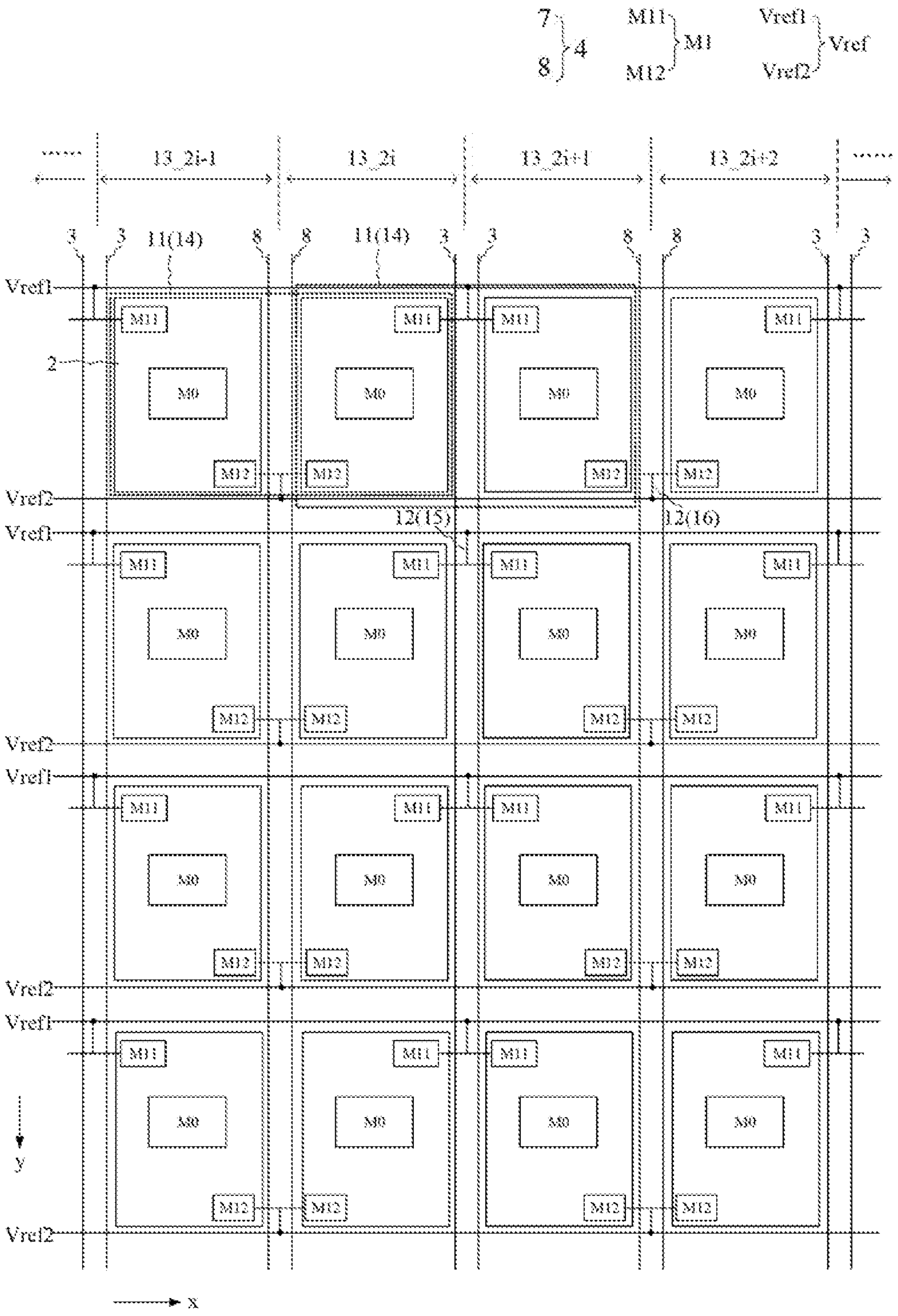
FIG. 2 is a schematic diagram of a partial structure of the display panel according to some embodiments of the present disclosure.

In some embodiments, as shown in FIG. 2, which is a schematic diagram of a partial structure of the display panel according to some embodiments of the present disclosure, the pixel circuit group 11 includes a first pixel circuit group 14. The first pixel circuit group 14 includes two adjacent pixel circuits 2 in two adjacent pixel columns 13. In other words, two adjacent pixel circuits 2 in two adjacent pixel columns 13 are arranged symmetrical to each other, and two adjacent pixel circuits 2 in any two adjacent pixel columns 13 can form a first pixel circuit group 14.

For clarity, in some embodiments of the present disclosure, along the first direction x, a $k1^{th}$ pixel column is denoted by a reference sign 13_*k*1. Only four pixel columns 13, i.e., a $(2i-1)^{th}$ pixel column 13_2*i*−1, a $2i^{th}$ pixel column 13_2*i*, a $(2i+1)^{th}$ pixel column 13_2*i*+1, and a (2i+2)th pixel column 13_2*i*+2, are illustrated in FIG. 2.

The first reset transistor M1 includes a first sub reset transistor M11 and a second sub reset transistor M12. The reset signal line $V_{ref}$ includes a first reset signal line $V_{ref}$1 electrically connected to the first sub reset transistor M11 and a second reset signal line $V_{ref}$2 electrically connected to the second sub reset transistor M12.

Figure 3:
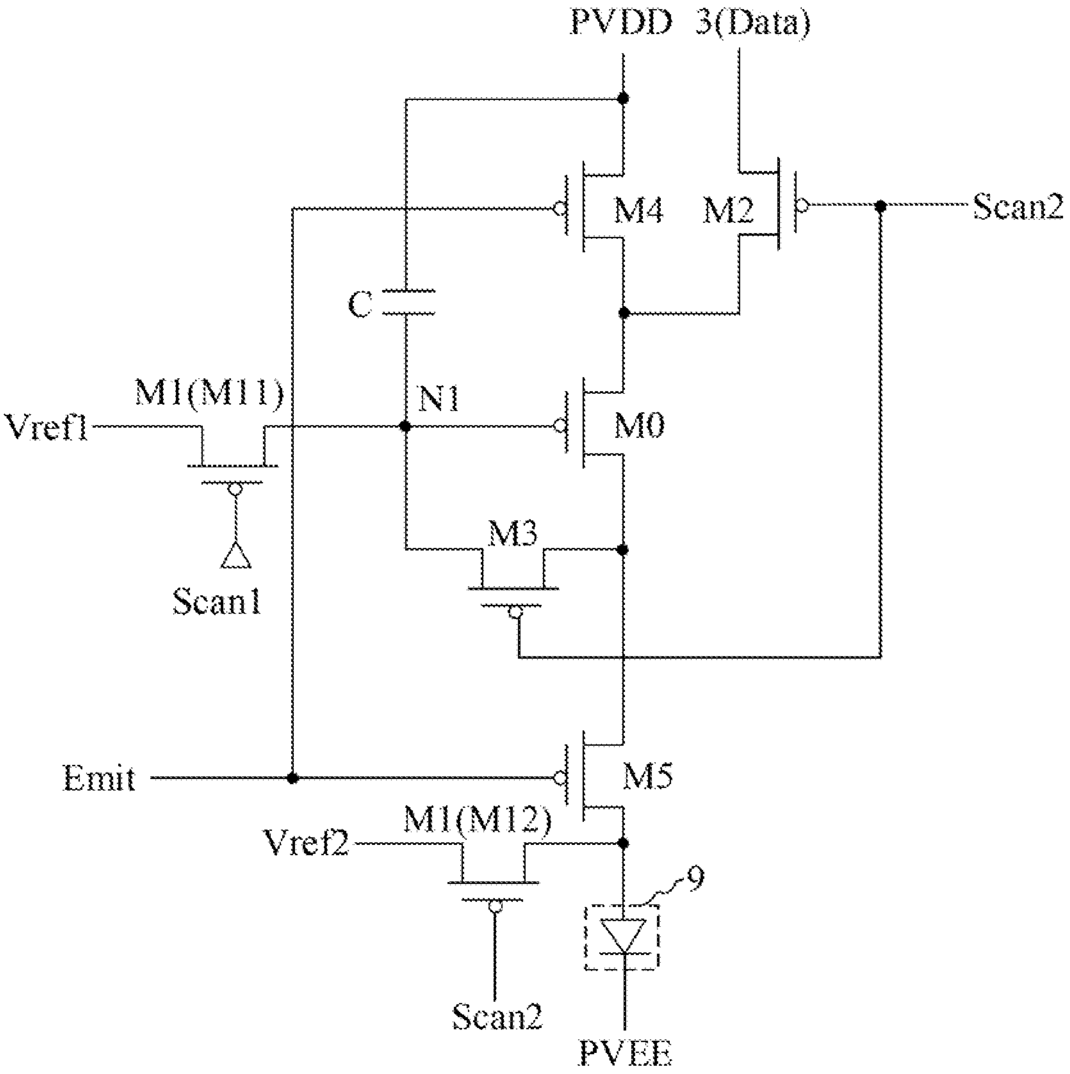
FIG. 3 is a schematic diagram of a circuit structure of a pixel circuit according to some embodiments of the present disclosure.

In one arrangement, as shown in FIG. 3, which is a schematic diagram of a circuit structure of a pixel circuit 2 according to some embodiments of the present disclosure, the first sub reset transistor M11 is electrically connected to a gate of the drive transistor M0, for resetting the gate of the drive transistor M0 by using a first reset voltage provided by the first reset signal line $V_{ref1}$ when turned on. The second sub reset transistor M12 is connected to the anode 10 of the light-emitting element 9, for resetting the anode 10 of the light-emitting element 9 by using a second reset voltage provided by the second reset signal line $V_{ref2}$ when turned on. The first reset voltage and the second reset voltage may be different from each other. In one arrangement, the second reset voltage may be lower than the first reset voltage, so as to alleviate the problem of undesirable lighting of the light-emitting element 9. Depending on different starting voltages of the light-emitting element 9, the second reset voltage may be higher than the first reset voltage so as to alleviate the problem of afterimage and color tailing, or a dynamic second reset voltage may be adopted to solve different problems at different time.

The first semiconductor connection line 12 includes a first connection line 15 and a second connection line 16.

The second sub reset transistors M12 in a $(2n-1)^{th}$ pixel column 13_2*n*−1 and a $2n^{th}$ pixel column 13_2*n* are adjacently arranged, and the two adjacent second sub reset transistors M12 are connected to each other through the second connection line 16. The second connection line 16 is electrically connected to the second reset signal line $V_{ref2}$. The first sub reset transistors M11 in the $2n^{th}$ pixel column 13_2*n* and a $(2n+1)^{th}$ pixel column 13_2*n*+1 are adjacently arranged, and the two adjacent first sub reset transistors M11 are connected to each other through the first connection line 15. The first connection line 15 is electrically connected to the first reset signal line $V_{ref1}$. Herein, n is a positive integer.

In other words, in some embodiments of the present disclosure, the second sub reset transistors M12 in the $1^{st}$ pixel column 13_1 and the $2^{nd}$ pixel column 13_2 are adjacently arranged, the second sub reset transistors M12 in the $3^{rd}$ pixel column 13_3 and the $4^{th}$ pixel column 13_4 are adjacently arranged, the second sub reset transistors M12 in the $5^{th}$ pixel column 13_5 and the $6^{th}$ pixel column 13_6 are adjacently arranged, and so on. The second sub reset transistors M12 in the $2^{nd}$ pixel column 13_2 and the $3^{rd}$ pixel column 13_3 are adjacently arranged, the second sub reset transistors M12 in the $4^{th}$ pixel column 13_4 and the $5^{th}$ pixel column 13_5 are adjacently arranged, the second sub reset transistors M12 in the $6^{th}$ pixel column 13_6 and the $7^{th}$ pixel column 13_7 are adjacently arranged, and so on.

In the above arrangement, the pixel circuits 2 are designed with symmetric columns. In this way, the second sub reset transistors M12 in the (2n−1)th pixel column 13_2*n*−1 and the $2n^{th}$ pixel column 13_2*n* can be very close to each other, and the adjacent second sub reset transistors M12 in this part of the pixel columns 13 can be connected together only through a very short second connection line 16. Therefore, on the basis of sharing a via-hole, an extension length of the semiconductor connection line between the adjacent second sub reset transistors M12 is further reduced, thereby reducing the shielding of ambient light by the semiconductor connection line. At the same time, the first sub reset transistors M11 in the $2n^{th}$ pixel column 13_2*n* and the (2n+1)th pixel column 13_2*n*+1 are also very close to each other, which can also reduce an extension length of the first connection line 15 between the adjacent first sub reset transistors M11 in this part of the pixel columns 13, thereby reducing the shielding of ambient light by the semiconductor connection line and thus further improving light transmittance of the display panel.

Figure 4:
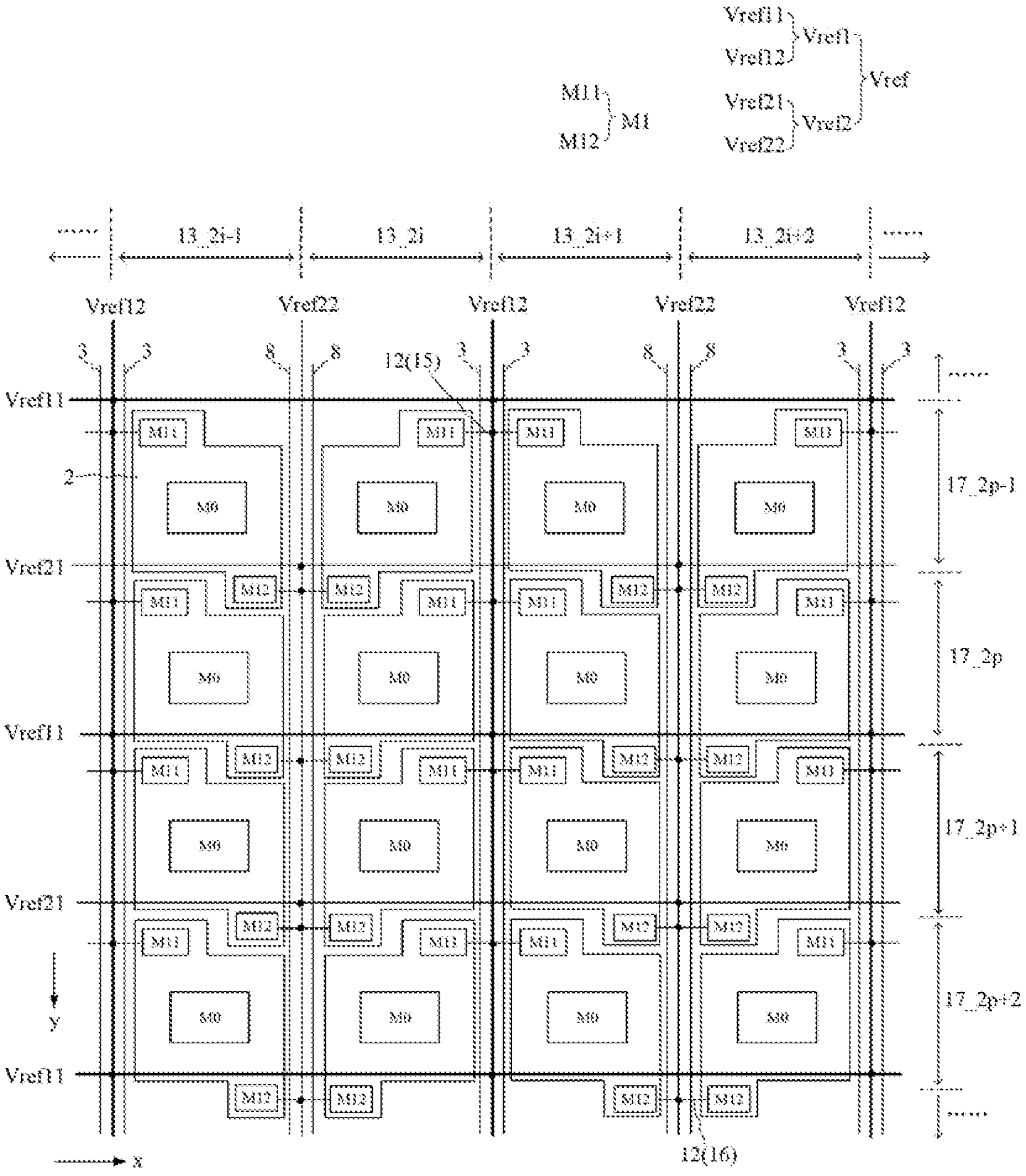
FIG. 4 is a schematic diagram of another partial structure of the display panel according to some embodiments of the present disclosure.
Figure 5:
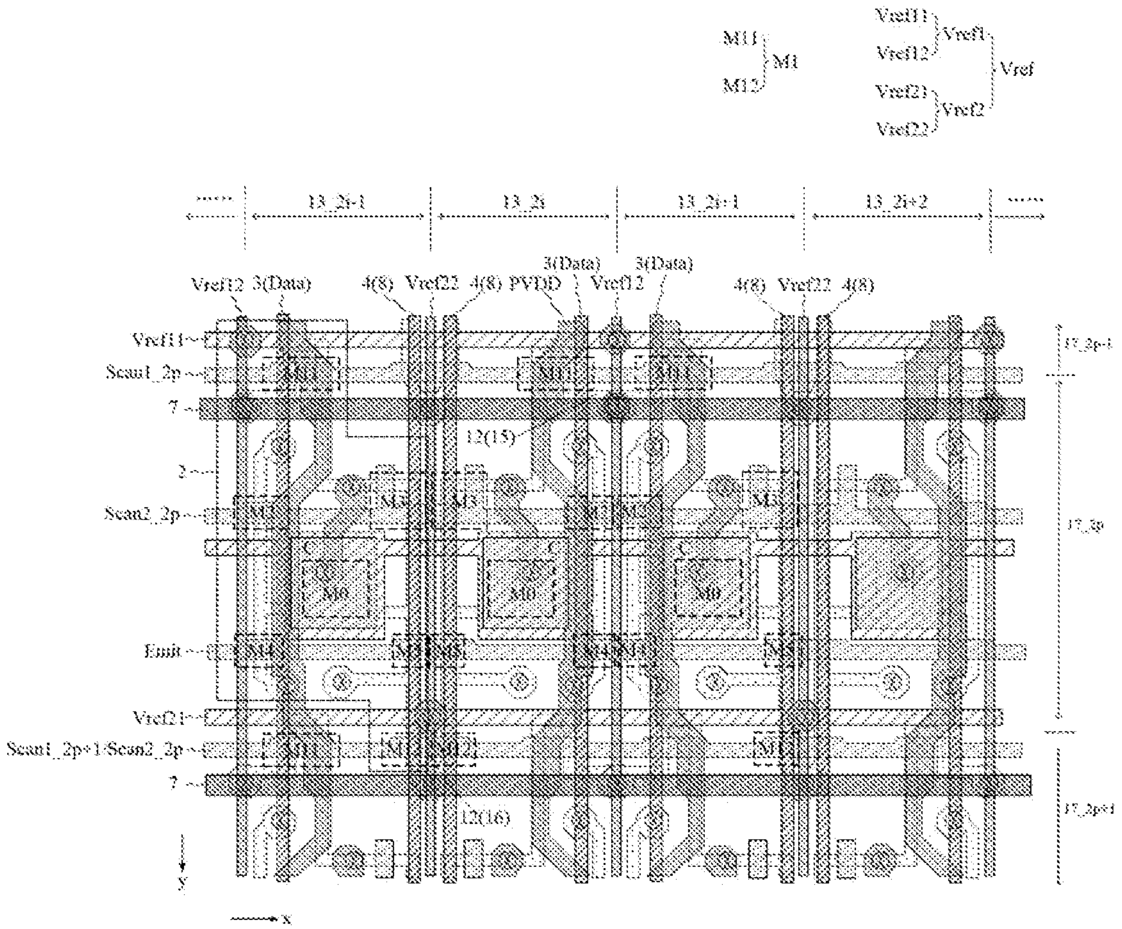
FIG. 5 is a schematic diagram of a layer structure of the display panel according to some embodiments of the present disclosure.

FIG. 4 is a schematic diagram of another partial structure of the display panel according to some embodiments of the present disclosure, and FIG. 5 is a schematic diagram of a layer structure of the display panel according to some embodiments of the present disclosure. In one or more embodiments, as shown in FIG. 4 and FIG. 5, the first reset signal line $V_{ref1}$ includes a first sub reset line $V_{ref11}$ and a second sub reset line $V_{ref12}$ electrically connected to each other. The second reset signal line $V_{ref2}$ includes a third sub reset line $V_{ref21}$ and a fourth sub reset line $V_{ref22}$ electrically connected to each other. The first sub reset line $V_{ref11}$ and the third sub reset line $V_{ref21}$ each extend along the first direction x, and the second sub reset line $V_{ref12}$ and the fourth sub reset line $V_{ref22}$ each extend along the second direction y.

The second sub reset line $V_{ref12}$ and the fourth sub reset line $V_{ref22}$ are arranged alternately, the second sub reset lines $V_{ref12}$ and the fourth sub reset line $V_{ref22}$ that are adjacent two each other are spaced by one pixel column 13, and the fourth sub reset line $V_{ref22}$ is located between the $(2n-1)^{th}$ pixel column 13_2*n*−1 and the $2n^{th}$ pixel column 13_2*n*. The first connection line 15 is electrically connected to the second sub reset line $V_{ref12}$, and the second connection line 16 is electrically connected to the fourth sub reset line $V_{ref22}$.

With this arrangement, on the one hand, the first sub reset line $V_{ref11}$ crosses the second sub reset line $V_{ref12}$ to form a grid structure, which can effectively reduce an overall wiring load of the first reset signal line $V_{ref1}$, and the third sub reset line crosses the fourth sub reset line $V_{ref22}$ to form a grid structure, which can effectively reduce an overall wiring load of the second reset signal line $V_{ref2}$. On the other hand, according to some embodiments of the present disclosure, the design of the arrangement of the second sub reset line $V_{ref12}$ and the fourth sub reset line $V_{ref22}$ is matched with the symmetric design of the pixel circuits 2. Taking the fourth sub reset line $V_{ref22}$ as an example, combined with the symmetric design of the pixel circuits 2, it can be known that the second sub reset transistors M12 in the $(2n-1)^{th}$ pixel column 13_2*n*−1 and the $2n^{th}$ pixel column 13_2*n* are very close to each other, and the second sub reset transistor M12 is connected to the second reset signal line $V_{ref2}$. Therefore, through the arrangement of the fourth sub reset line $V_{ref22}$ in the second reset signal line $V_{ref2}$ between the $(2n-1)^{th}$ pixel column 13_2*n*−1 and the $2n^{th}$ pixel column 13_2*n*, the second connection line 16 connected between the two adjacent second sub reset transistors M12 can be directly connected through a via-hole at a position overlapping with the fourth sub reset line $V_{ref22}$. In this case, an extension length of the second connection line 16 can be further shortened, thereby further reducing the shading of the ambient light by the second connection line 16.

Further, referring to FIG. 4 again, the display panel further includes a plurality of pixel rows 17 arranged along the second direction y. The pixel rows 17 each include a plurality of pixel circuits 2 arranged along the first direction x. The first sub reset line $V_{ref11}$ and the third sub reset line $V_{ref21}$ are arranged alternately, and the first sub reset lines $V_{ref11}$ and the third sub reset line $V_{ref21}$ that are adjacent to each other are spaced by the drive transistor M0 in one pixel row 17.

For clarity, in the drawings in some embodiments of the present disclosure, along the second direction y, a $k2^{th}$ pixel row is denoted by a reference sign 17_*k*2. Only four pixel rows 17, i.e., a $(2p-1)^{th}$ pixel row 17_2*p*−1, a $2p^{th}$ pixel row 17_2*p*, a $(2p+1)^{th}$ pixel row 17_2*p*+1, and a $(2p+2)^{th}$ pixel row 17_2*p*+2, are illustrated in FIG. 4.

With such a configuration, a number of the first sub reset lines $V^{ref11}$ and the third sub reset lines $V_{ref21}$ can be reduced. Moreover, although one pixel row 17 only corresponds to one first sub reset line $V_{ref11}$ or one third sub reset line $V_{ref21}$, the first sub reset transistor M11 in this one pixel row 17 can be connected to the first sub reset line $V_{ref11}$ through the second sub reset line $V_{ref12}$ and the second sub reset transistor M12 in this one pixel row 17 can be connected to the third sub reset line $V_{ref21}$ through the fourth sub reset line $V_{ref22}$.

Figure 6:
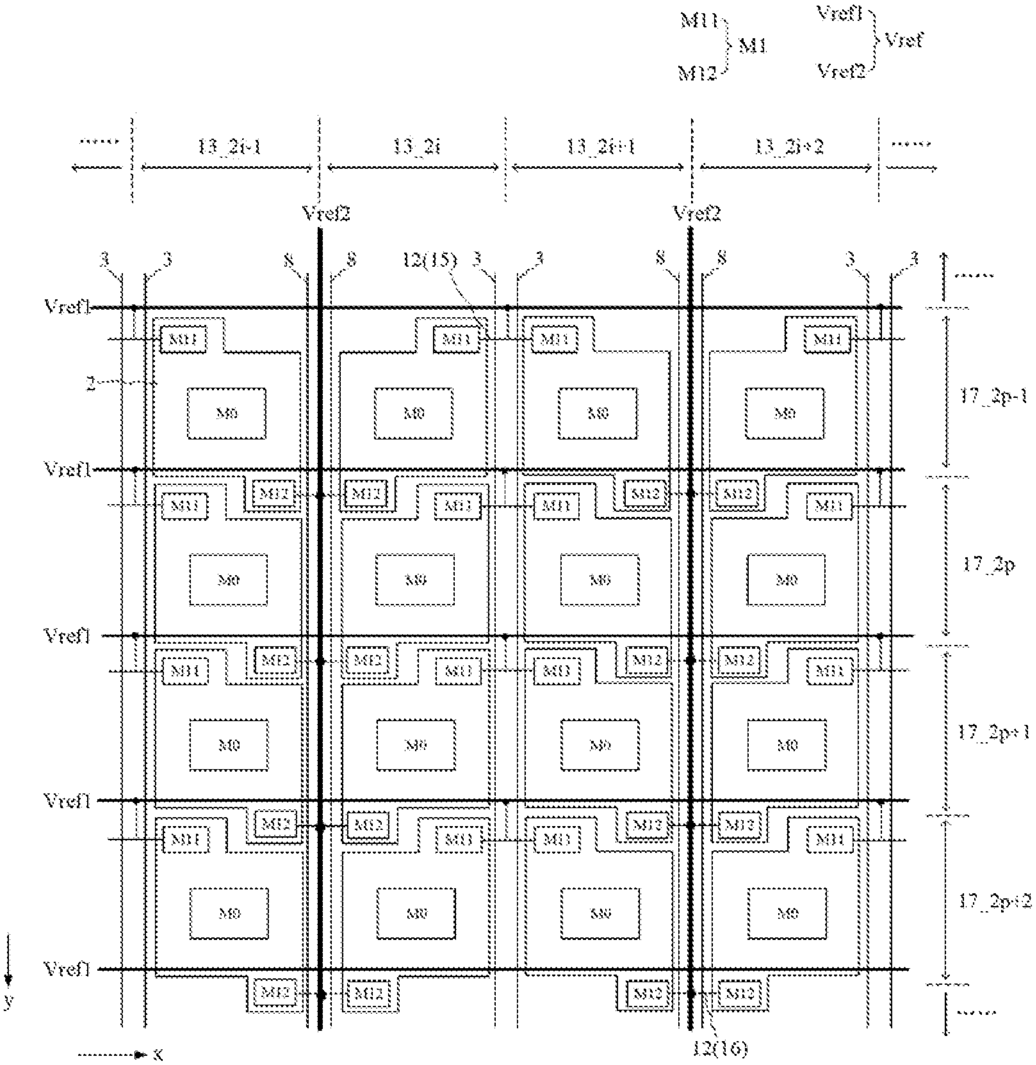
FIG. 6 is a schematic diagram of yet another partial structure of the display panel according to some embodiments of the present disclosure.

FIG. 6 is a schematic diagram of yet another partial structure of the display panel according to some embodiments of the present disclosure. In one or more embodiments, as shown in FIG. 6, the display panel further includes a plurality of pixel rows 17 arranged along the second direction y. The pixel rows 17 each include a plurality of pixel circuits 2 arranged along the first direction x.

The first reset signal line $V_{ref1}$ extends along the first direction x, and one pixel row 17 corresponds to one first reset signal line $V_{ref1}$. The second reset signal line $V_{ref2}$ extends along the second direction y, and the second reset signal line $V_{ref2}$ is located between the $(2n-1)^{th}$ pixel column 13_2*n*−1 and the $2n^{th}$ pixel column 13_2*n*.

In the above arrangement, each pixel row 17 corresponds to one first reset signal line $V_{ref1}$ that extends horizontally. In this case, the first sub reset transistor M11 in each pixel row 17 can be connected to the first reset signal line $V_{ref1}$ close thereto, and a connection distance between the first sub reset transistor M11 and the first reset signal line $V_{ref1}$ is short. Based on the symmetrical design of the pixel circuits, the second sub reset transistors M12 in the $(2n-1)^{th}$ pixel column 13_2*n*−1 and the $2n^{th}$ pixel column 13_2*n* are very close to each other. Through the arrangement of a vertically extending second reset signal line $V_{ref2}$ between the $(2n-1)^{th}$ pixel column 13_2*n*−1 and the $2n^{th}$ pixel column 13_2*n*, a connection distance between the second sub reset transistor M12 and the second reset signal line $V_{ref2}$ can be short. Therefore, with the above arrangement, the extension lengths of the first connection line 15 and the second connection line 16 can be shortened, thereby further improving the light transmittance of the display panel.

In addition, in the above arrangement, there is no need to arrange the second reset signal line $V_{ref2}$ between the $2n^{th}$ pixel column 13_2*n* and the $(2n+1)^{th}$ pixel column 13_2*n*+1 which can further greatly reduce the number of the second reset signal lines $V_{ref2}$ arranged between the pixel columns 13.

Figure 7:
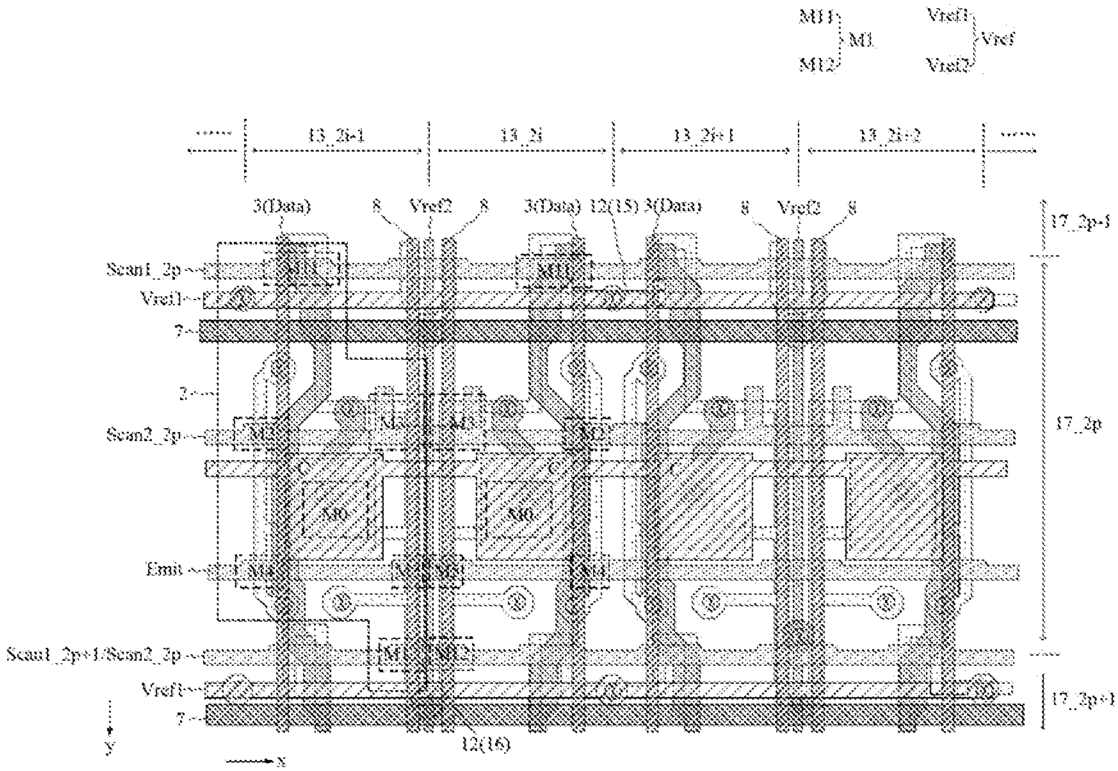
FIG. 7 is a schematic diagram of another layer structure of the display panel according to some embodiments of the present disclosure.

FIG. 7 is a schematic diagram of another layer structure of the display panel according to some embodiments of the present disclosure. In some embodiments, as shown in FIG. 7, the first sub reset transistor M11 is further electrically connected to a first scanning signal line Scan1, and the first connection line 15 and the first reset signal line $V_{ref1}$ connected thereto are located at a same side of the first scanning signal line Scan1. In this case, the first connection line 15 is not required to cross the first scanning signal line Scan1 to be connected to the first reset signal line $V_{ref1}$, and the first connection line 15 does not overlap with the first scanning signal line Scan1. Therefore, signal interference between the first connection line 15 and the first scanning signal line Scan1 can be reduced, and the extension length of the first connection line 15 can also be reduced.

Figure 8:
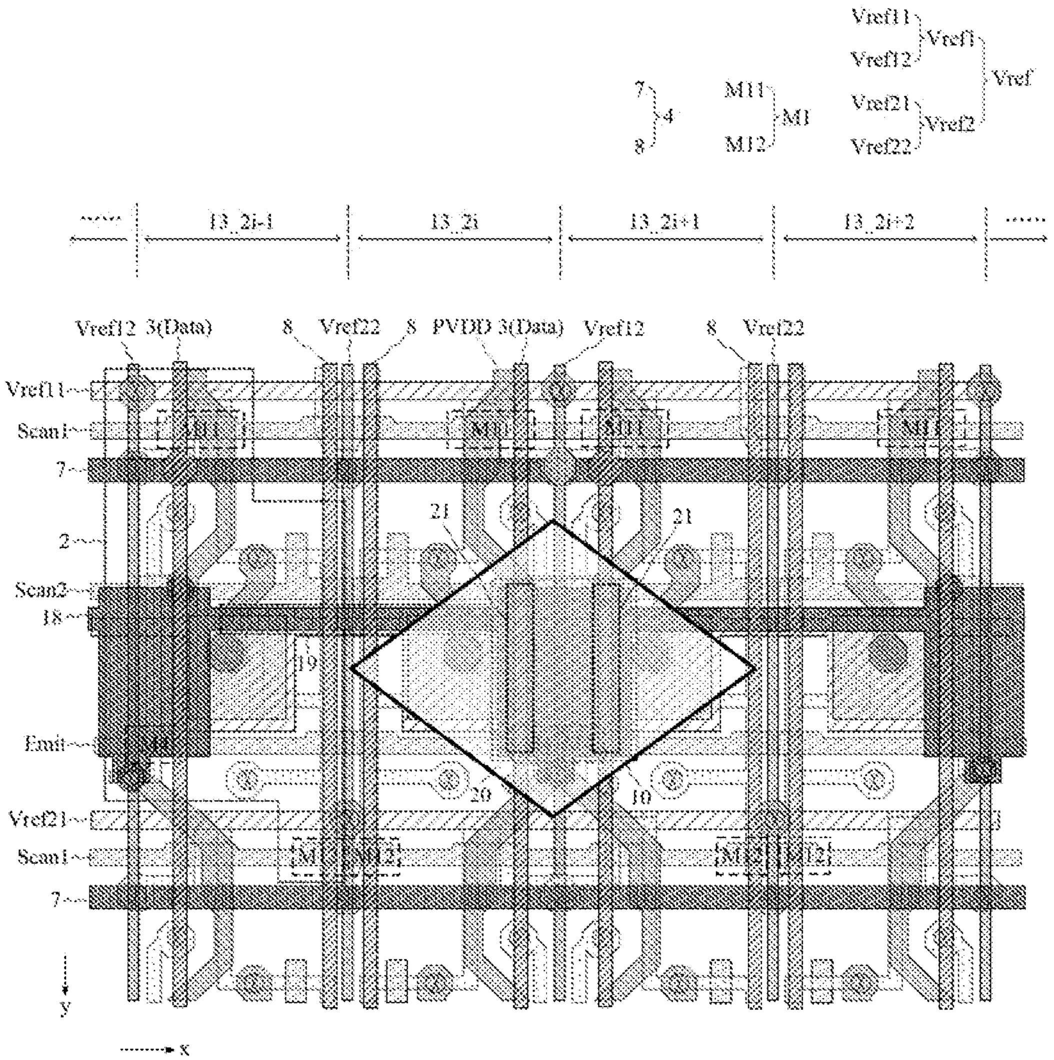
FIG. 8 is a schematic diagram of yet another layer structure of the display panel according to some embodiments of the present disclosure.
Figure 9:
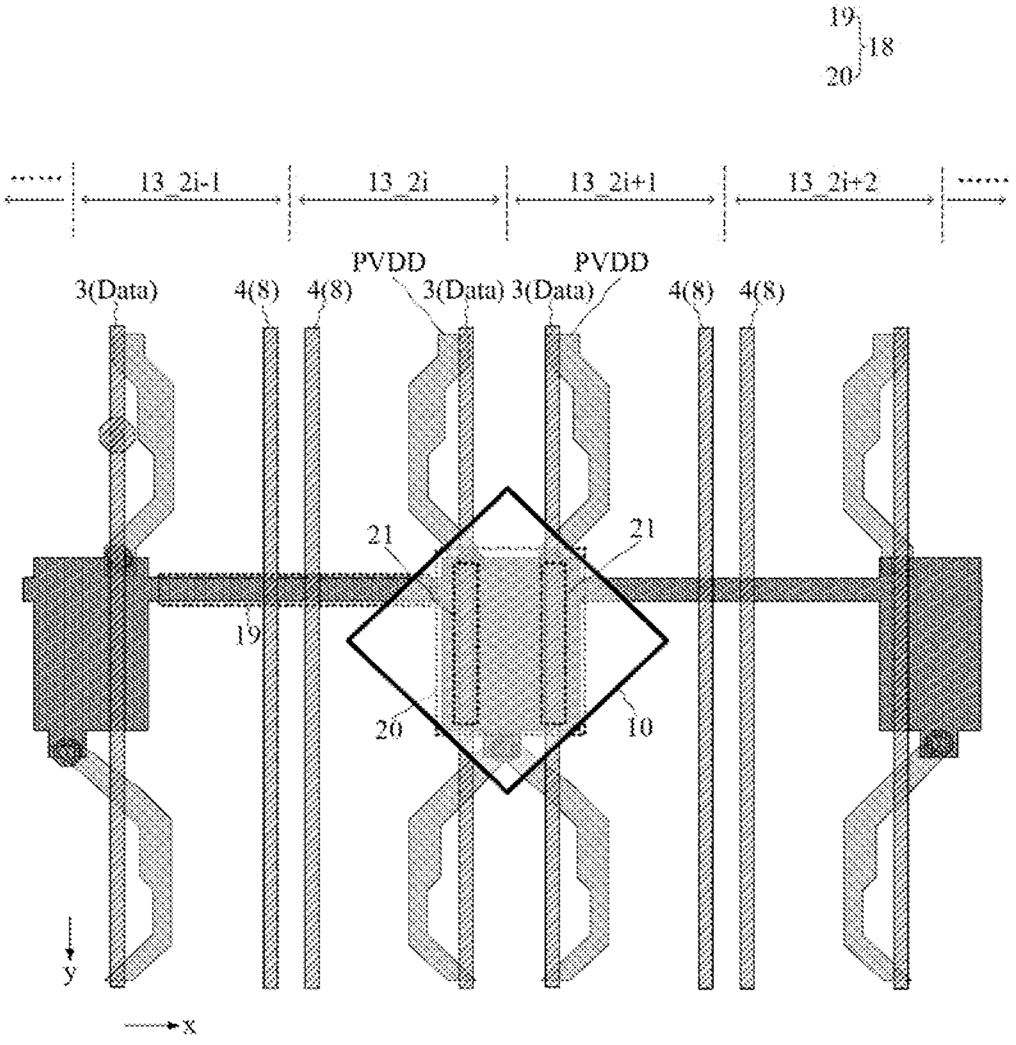
FIG. 9 is a schematic diagram of a layer structure of an auxiliary power signal line, a power signal line, a first signal line, and an anode according to some embodiments of the present disclosure.
Figure 10:
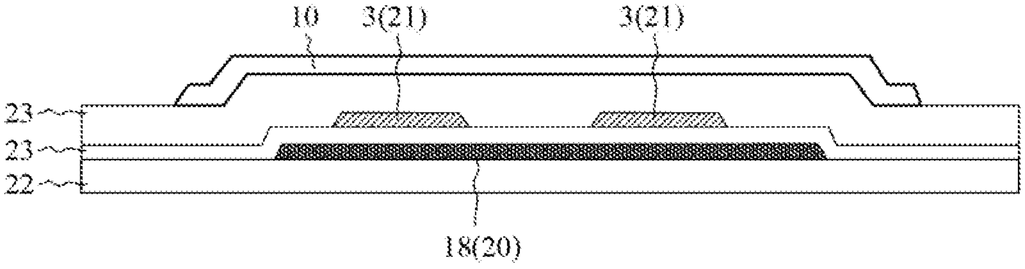
FIG. 10 is a schematic diagram of layer positions of the auxiliary power signal line, the power signal line, the first signal line, and the anode according to some embodiments of the present disclosure.

In one or more some embodiments, referring to FIG. 2, the pixel circuit group 11 includes a first pixel circuit group 14. The first pixel circuit group 14 includes two adjacent pixel circuits 2 in two adjacent pixel columns 13. FIG. 8 is a schematic diagram of yet another layer structure of the display panel according to some embodiments of the present disclosure, FIG. 9 is a schematic diagram of a layer structure of an auxiliary power signal line 18, a power signal line PVDD, a first signal line 3, and an anode 10 according to some embodiments of the present disclosure, and FIG. 10 is a schematic diagram of layer positions of the auxiliary power signal line 18, the power signal line PVDD, the first signal line 3, and the anode 10 according to some embodiments of the present disclosure. As shown in FIG. 8 to FIG. 10, the first signal line 3 is located between the drive transistors M0 in the $2n^{th}$ pixel column 13_2*n* and the $(2n+1)^{th}$ pixel column 13_2*n*+1.

The pixel circuit 2 further includes a first light-emitting control transistor M4. The first light-emitting control transistor M4 is electrically connected to the power signal line PVDD. The power signal line PVDD extends along the second direction y. First light-emitting control transistors M4 in the $2n^{th}$ pixel column 13_2*n* and the $(2n+1)^{th}$ pixel column 13_2*n*+1 are adjacent to each other, and two power signal lines PVDD connected to the $2n^{th}$ pixel column 13_2*n* and the $(2n+1)^{th}$ pixel column 13_2*n*+1 are adjacent to each other.

The display panel further includes an auxiliary power connection line 18. The auxiliary power connection line 18 is located at a side of the first signal line 3 and the second connection signal line 8 facing away from a light-exit surface of the display panel. For example, the auxiliary power connection line 18 may be arranged in a same layer as the first connection signal line 7. The auxiliary power connection line 18 includes a first line segment 19 and a first bearing portion 20, a size of the first bearing portion 20 in the second direction y is greater than that of the first line segment 19 in the second direction y, and the first bearing portion 20 is electrically connected to the power signal line PVDD. In the direction perpendicular to the plane where the display panel is located, the first bearing portion 20 overlaps with two adjacent first signal lines 3.

A part of the first signal line 3 overlapping with the first bearing portion 20 is a first wiring segment 21. In the direction perpendicular to the plane where the display panel is located, part of the anodes 10 overlaps with the first wiring segments 21 in two adjacent first signal lines 3.

It is to be noted that, referring to FIG. 10, the display panel further includes a substrate 22 and an insulating layer 23, and at least one insulating layer 23 may be provided between the auxiliary power signal line 18 and the first signal line 3 and between the first signal line 3 and the anode 10, respectively.

The first bearing portion 20 in the auxiliary power connection line 18 may support the first wiring segments 21 in the two adjacent first signal lines 3, thereby making positions of the first wiring segments 21 and surrounding positions be relatively flat. So, when the anode 10 is arranged above the first wiring segments 21, the anode 10 may also be flat. In addition, a large block metal structure formed by the first bearing portion 20 can also reduce a load of the power signal line PVDD.

Figure 11:
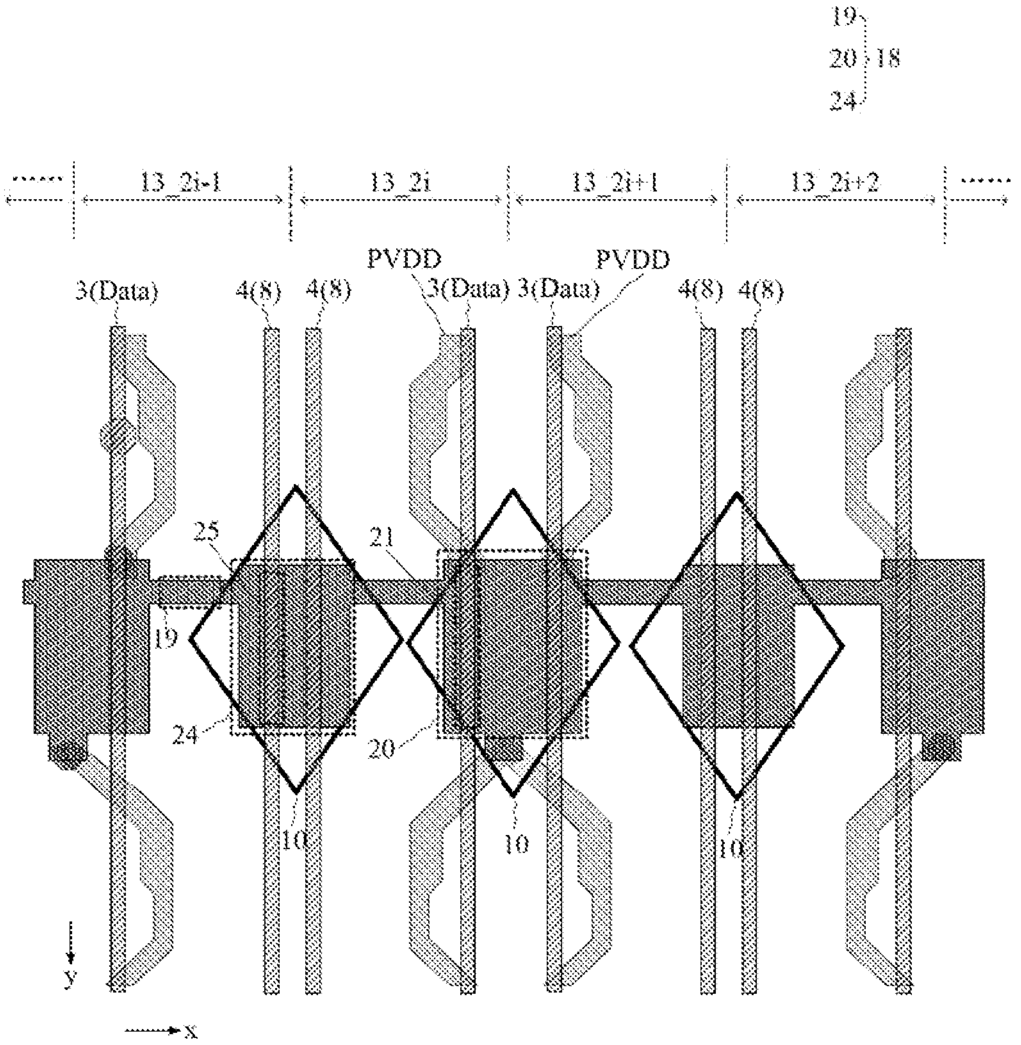
FIG. 11 is a schematic diagram of another layer structure of the auxiliary power signal line, the power signal line, the first signal line, and the anode according to some embodiments of the present disclosure.

FIG. 11 is a schematic diagram of another layer structure of the auxiliary power signal line 18, the power signal line PVDD, the first signal line 3, and the anode 10 according to some embodiments of the present disclosure. In some embodiments, as shown in FIG. 11, the auxiliary power connection line 18 further includes a second bearing portion 24, a size of the second bearing portion 24 in the second direction y is greater than that of the first line segment 19 in the second direction y, and in the direction perpendicular to the plane where the display panel is located, the second bearing portion 24 overlaps with two adjacent second connection signal lines 8.

A part of the second connection signal line 8 overlapping with the second bearing portion 24 is a second wiring segment 25. In the direction perpendicular to the plane where the display panel is located, part of the anode 10 overlaps with the second wiring segments 25 in two adjacent second connection signal lines 8.

Similar to the first bearing portion 20, the second bearing portion 24 in the auxiliary power connection line 18 may support the second wiring segments 25 in the two adjacent second connection lines, thereby improving layer flatness of the anode 10 above the second wiring segments 25, so that the layers of a greater number of anodes 10 in the display panel are relatively flat.

Figure 12:
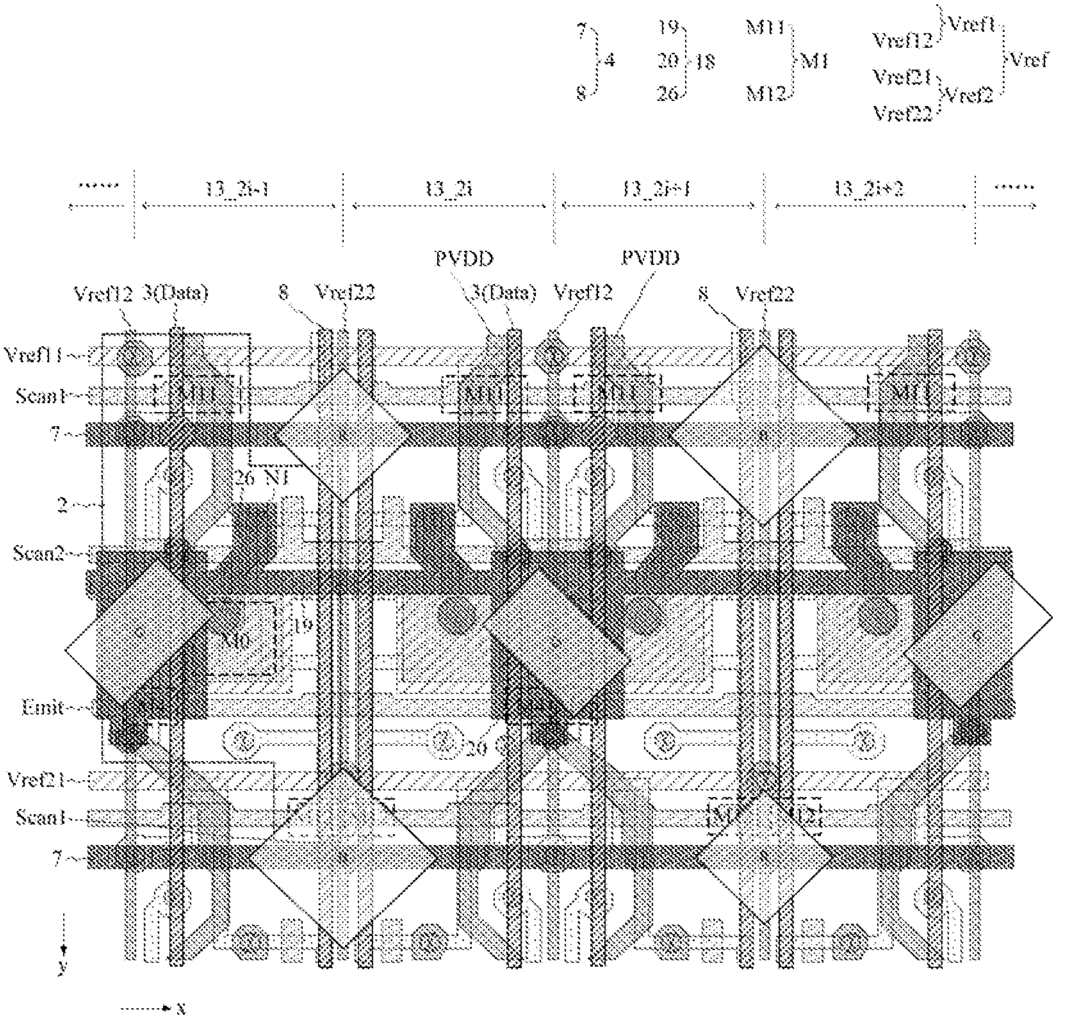
FIG. 12 is a schematic diagram of still another layer structure of the display panel according to some embodiments of the present disclosure.

FIG. 12 is a schematic diagram of still another layer structure of the display panel according to some embodiments of the present disclosure. In one or more embodiments, as shown in FIG. 12, the gate of the drive transistor M0 is electrically connected to a first node N1. The auxiliary power connection line 18 further includes a first protruding portion 26 protruding from the first line segment 19. In the direction perpendicular to the plane where the display panel is located, the first protruding portion 26 overlaps with the first node N1.

It can be understood that, in the pixel circuit 2, operational stability of the drive transistor M0 greatly affects accuracy of the driving current transferred from the pixel circuit 2 to the light-emitting element 9. In some embodiments of the present disclosure, through the further arrangement of the first protruding portion 26 overlapping with the first node N1 on the auxiliary power connection line 18, a potential of the gate of the drive transistor M0 can be stabilized by using a fixed power supply voltage transferred on the first protruding portion 26, thereby improving reliability of an operating state of the drive transistor M0.

Figure 13:
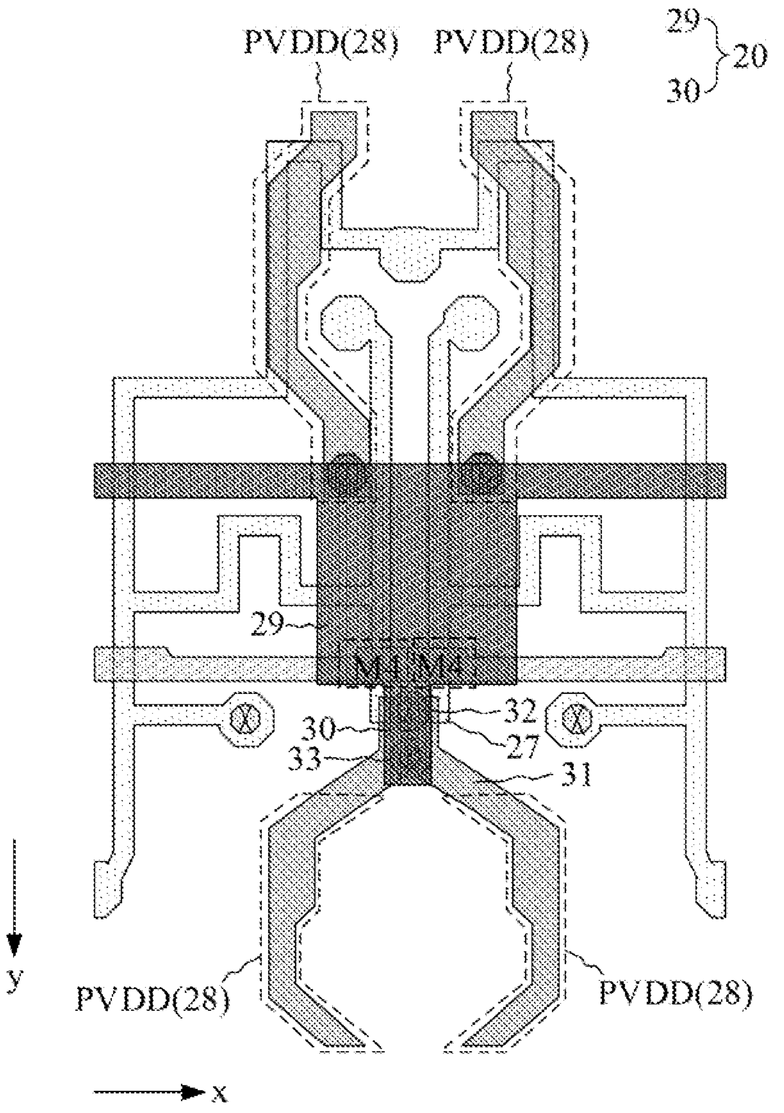
FIG. 13 is a schematic diagram of another layer structure of the display panel according to some embodiments of the present disclosure.

FIG. 13 is a schematic diagram of another layer structure of the display panel according to some embodiments of the present disclosure. In one or more embodiments, as shown in FIG. 13, adjacent first light-emitting control transistors M4 in the $2n^{th}$ pixel column 13_2*n* and the $(2n+1)^{th}$ pixel column 13_2*n*+1 are connected to each other through a second semiconductor connection line 27.

The power signal line PVDD includes a plurality of second line segments 28. Two adjacent second line segments 28 in one power signal line PVDD are spaced apart. The first bearing portion 20 includes a main body portion 29 and a protruding portion 30. End portions of two adjacent second line segments 28 close to the protruding portion 30 are connected to each other through a first connection wire 31. The second semiconductor connection line 27 is electrically connected to the first connection wire 31 through a first via-hole 32, and the first connection wire 31 is electrically connected to the protruding portion 30 through a second via-hole 33.

In the above arrangement, while the flatness of the anode 10 is improved by using the first bearing portion 20, the first bearing portion 20 also serves as a connection portion between two adjacent second line segments 28 in the power signal line PVDD, forming a continuous signal transmission path in the power signal line PVDD.

In addition, it is to be further noted that the layer structure of the display panel includes a semiconductor layer, a first metal layer, a second metal layer, and a third metal layer. The semiconductor layer may include structures such as a first semiconductor connection line 12 and a second semiconductor connection line 27. The first metal layer may include structures such as a first scanning signal line Scan1 and a second scanning signal line Scan2. The second metal layer may include structures such as a first reset signal line $V_{ref1}$, a second reset signal line $V_{ref2}$, and an electrode plate of the storage capacitor C in the pixel circuit 2. The third metal layer may include structures such as the power signal line PVDD. In an existing manufacturing process of the display panel, generally, holes are formed between the third metal layer and the second metal layer and between the third metal layer and the semiconductor layer.

Based on the above arrangement, the first connection wire 31 connected between two adjacent second line segments 28 is located in the third metal layer, therefore, when two adjacent first light-emitting control transistors M4 are connected to each other through the second semiconductor connection line 27, the first via-hole 32 connecting the second semiconductor connection line 27 with the first connection wire 31 can be formed together when a via-hole is formed between the third metal layer and the semiconductor layer. In some embodiments, when a connection via-hole is formed between the third metal layer and the semiconductor layer, an insulating layer between the third metal layer and the second metal layer, an insulating layer between the second metal layer and the first metal layer, and an insulating layer between the first metal layer and the semiconductor layer may be perforated by using a same mask, thereby saving a number of masks required.

In addition, based on the above arrangement, two adjacent first light-emitting control transistors M4 are connected together through the second semiconductor connection line 27, and then are connected to the protruding portion 30 through the first via-hole 32 and the second via-hole 33, so that the two first light-emitting control transistors M4 are not required to be connected to the power signal line PVDD respectively through separate connection via-holes. In this way, when designing the connection via-hole between the first light-emitting control transistor M4 and the power signal line PVDD, an area of the connection via-hole can be appropriately increased to alleviate voltage drop when a power signal is transmitted in the via-hole.

In some embodiments, one side of the protruding portion 30 close to the substrate may be provided with an organic film with a thickness greater than 500 nm to reduce a load of the PVDD. The thickness of the organic film may be 500 nm, 600 nm, 1 μm, or greater.

It is to be noted that FIG. 13 merely illustrates a situation where one side of the main body portion 29 is provided with the protruding portion 30. In other arrangements of the present disclosure, two sides of the main body portion 29 may be each provided with the protruding portion 30.

In some embodiments, referring to FIG. 13 again, in the direction perpendicular to the plane where the display panel is located, the first via-hole 32 and the second via-hole 33 do not overlap with each other. That is, the first via-hole 32 and the second via-hole 33 are staggered from each other.

The above design that the first via-hole 32 and the second via-hole 33 do not overlap with each other can prevent an extremely deep via-hole due to the overlapping of the two, thereby preventing problems such as etching residues or faults in an upper metal layer in the manufacturing process. Moreover, based on the above design, the protruding portion 30 protrudes from the second semiconductor connection line 27, thereby shielding the second semiconductor connection line 27 to a greater extent, so that a potential of the second electrode of each of the two first light-emitting control transistors M4 can be stabilized to a greater extent by using the power supply voltage transferred on the protruding portion 30, thereby optimizing the display effect.

Figure 14:
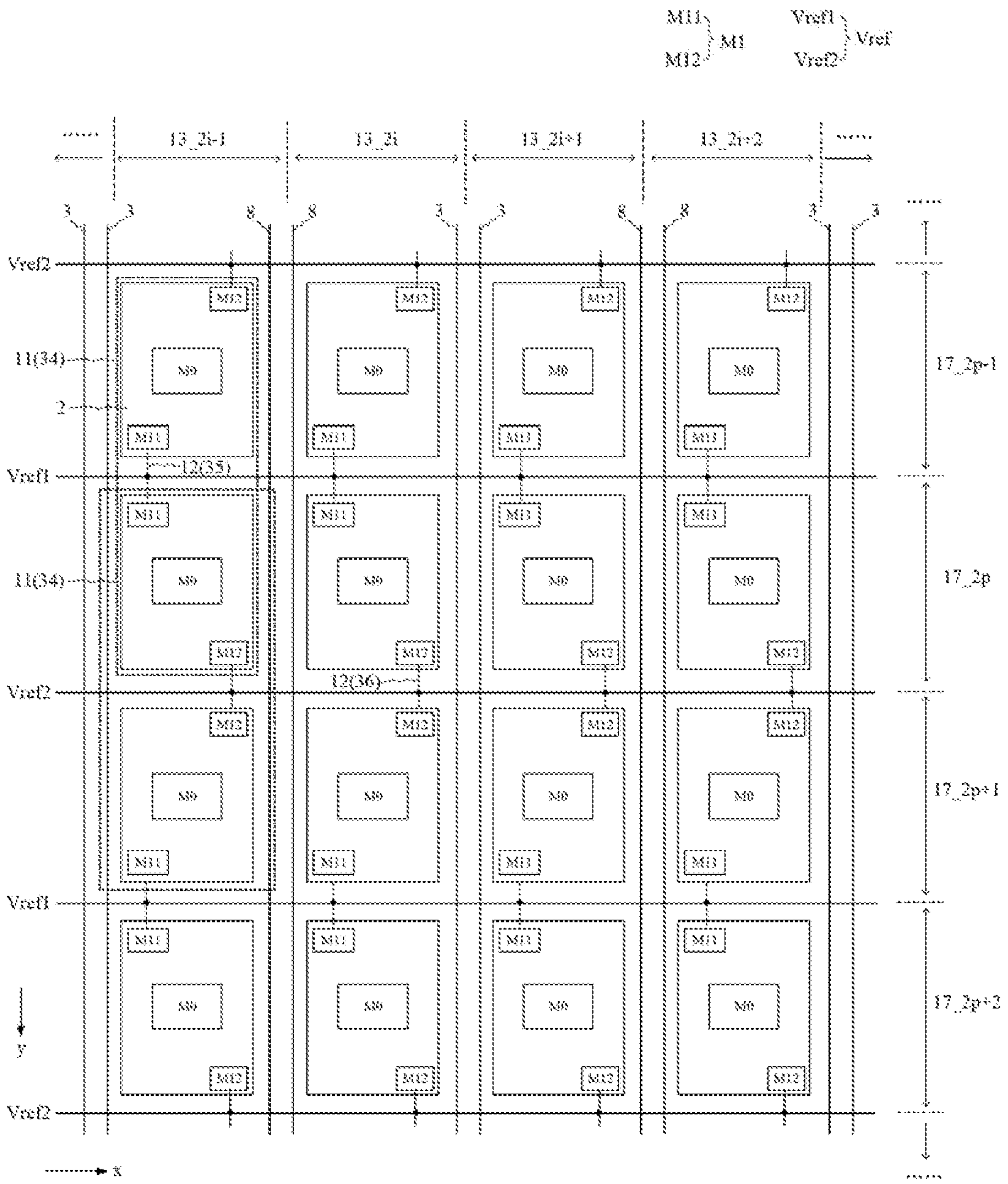
FIG. 14 is a schematic diagram of still another partial structure of the display panel according to some embodiments of the present disclosure.
Figure 15:
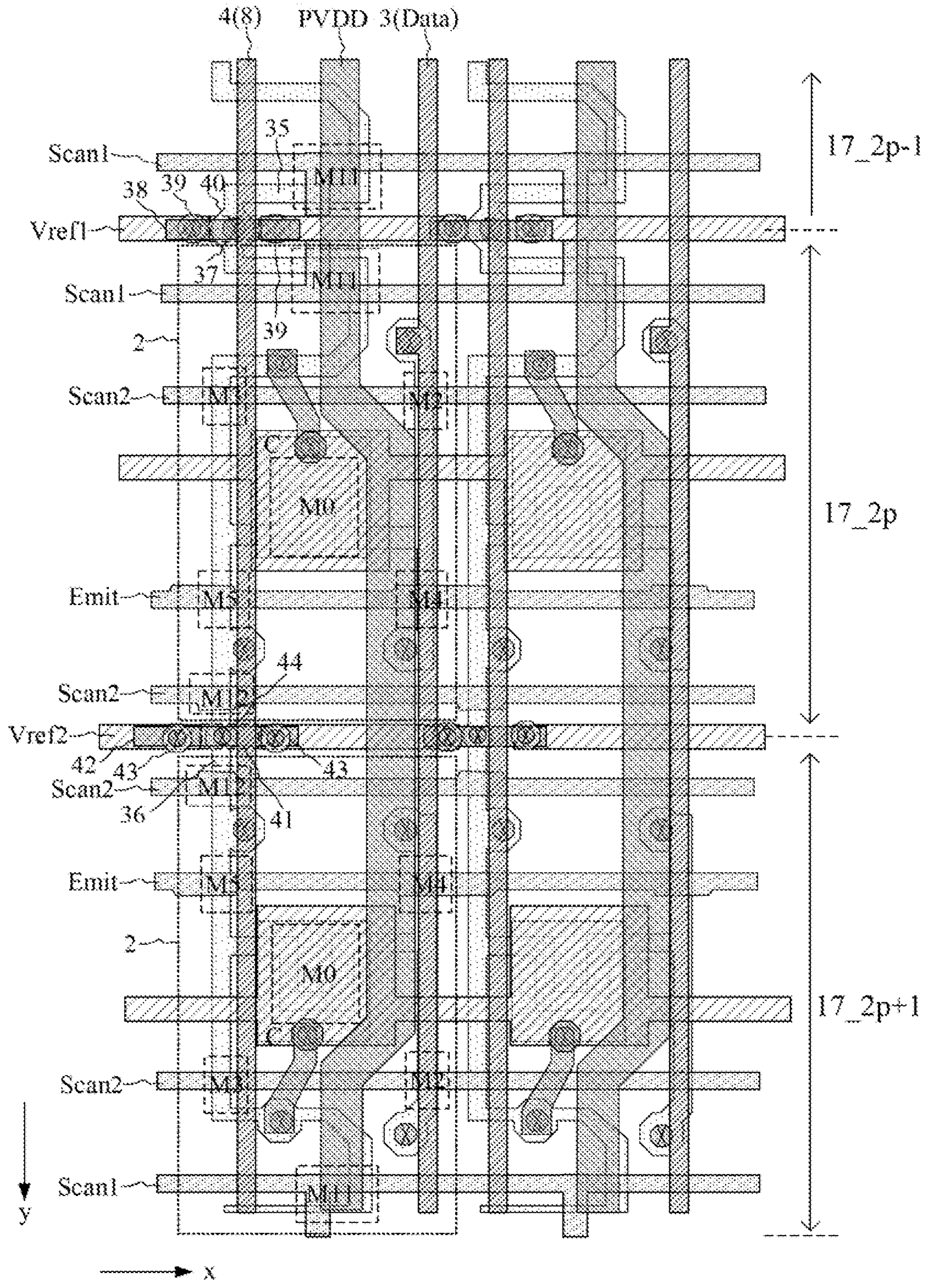
FIG. 15 is a schematic diagram of another layer structure of the display panel according to some embodiments of the present disclosure.

FIG. 14 is a schematic diagram of still another partial structure of the display panel according to some embodiments of the present disclosure, and FIG. 15 is a schematic diagram of another layer structure of the display panel according to some embodiments of the present disclosure. In one or more embodiments, as shown in FIG. 14 and FIG. 15, the display panel includes a plurality of pixel rows 17 arranged along the second direction y. The pixel rows 17 each include a plurality of pixel circuits 2 arranged along the first direction x. The pixel circuit group 11 includes a second pixel circuit group 34. The second pixel circuit group 34 includes two adjacent pixel circuits 2 in two adjacent pixel rows 17. In other words, the pixel circuits 2 in two adjacent pixel rows 17 are arranged symmetrically, and two adjacent two pixel circuits 2 in any two adjacent pixel rows 17 can form a second pixel circuit group 34.

For clarity, in the drawings in some embodiments of the present disclosure, along the second direction y, a k2$^{th}$ pixel row is denoted by a reference sign 17_*k*2. Only four pixel rows 17, i.e., a (2p−1)$^{th}$ pixel row 17_2*p*−1, a 2p$^{th}$ pixel row 17_2*p*, a (2p+1)$^{th}$ pixel row 17_2*p*+1, and a (2p+2)$^{th}$ pixel row 17_2*p*+2, are illustrated in FIG. 14.

The first reset transistor M1 includes a first sub reset transistor M11 and a second sub reset transistor M12. The reset signal line $V_{ref}$ includes a first reset signal line $V_{ref1}$ electrically connected to the first sub reset transistor M11 and a second reset signal line $V_{ref2}$ electrically connected to the second sub reset transistor M12.

The first semiconductor connection line 12 includes a third connection line 35 and a fourth connection line 36.

The first sub reset transistors M11 in a (2n−1)$^{th}$ pixel row 17_2*n*−1 and a 2n$^{th}$ pixel row 17_2*n* are adjacently arranged, and the two adjacent first sub reset transistors M11 are connected to each other through the third connection line 35. The third connection line 35 is electrically connected to the first reset signal line $V_{ref1}$1. The second sub reset transistors M12 in the 2n$^{th}$ pixel row 17_2*n* and a (2n+1)$^{th}$ pixel row 17_2*n*+1 are adjacently arranged, and the two adjacent second sub reset transistors M12 are connected to each other through the fourth connection line 36. The fourth connection line 36 is electrically connected to the second reset signal line $V_{ref2}$. n is a positive integer.

In other words, in some embodiments of the present disclosure, the first sub reset transistors M11 in the 1$^{st}$ pixel row 17_1 and the 2$^{nd}$ pixel row 17_2 are adjacently arranged, the first sub reset transistors M11 in the 3$^{rd}$ pixel row 17_3 and the 4$^{th}$ pixel row 17_4 are adjacently arranged, the first sub reset transistors M11 in the 5$^{th}$ pixel row 17_5 and the 6$^{th}$ pixel row 17_6 are adjacently arranged, and so on. The second sub reset transistors M12 in the 2$^{nd}$ pixel row 17_2 and the 3$^{rd}$ pixel row 17_3 are adjacently arranged, the second sub reset transistors M12 in the 4$^{th}$ pixel row 17_4 and the 5$^{th}$ pixel row 17_5 are adjacently arranged, the second sub reset transistors M12 in the 6$^{th}$ pixel row 17_6 and the 7$^{th}$ pixel row 17_7 are adjacently arranged, and so on.

In the above arrangement, the pixel circuits 2 are designed with symmetric rows. In this case, the first sub reset transistors M11 in the (2n−1)$^{th}$ pixel row 17_2*n*−1 and the 2n$^{th}$ pixel row 17_2*n* can be very close to each other, and the adjacent first sub reset transistors M11 in this part of the pixel rows 17 can be connected together only through a very short third connection line 35. Therefore, on the basis of sharing a via-hole, an extension length of the semiconductor connection line between the adjacent first sub reset transistors M11 is further reduced, thereby reducing the shielding of ambient light by the semiconductor connection line. At the same time, the second sub reset transistors M12 in the 2n$^{th}$ pixel row 17_2*n* and the (2n+1)th pixel row 17_2*n*+1 are also very close to each other, thereby reducing an extension length of the fourth connection line 36 between the adjacent second sub reset transistors M12 in this part of the pixel rows 17, and thus reducing the shielding of ambient light by the semiconductor connection line and further improving the light transmittance of the display panel.

In some embodiments, referring to FIG. 14, the first reset signal line $V_{ref1}$ and the second reset signal line $V_{ref2}$ each extend along the first direction x. The first reset signal line $V_{ref1}$ and the second reset signal line $V_{ref2}$ are arranged alternately, and the first reset signal lines $V_{ref1}$ and the second reset signal line $V_{ref2}$ that are adjacent to each other are spaced by the drive transistor M0 in one pixel row 17. The first reset signal line $V_{ref1}$ is located between the drive transistors M0 in the $(2n-1)^{th}$ pixel row **17_2*n*-1 and the $2n^{th}$ pixel row 17_2*n***.

In some embodiments of the present disclosure, the wiring of the first reset signal line $V_{ref1}$ and the second reset signal line $V_{ref2}$ is also designed to match the symmetric design of the pixel circuits 2, so that the first reset signal line $V_{ref1}$ is very close to the first sub reset transistor M11 connected thereto, and the second reset signal line $V_{ref2}$ is very close to the second sub reset transistor M12 connected thereto, thereby reducing extension lengths of the third connection line 35 and the fourth connection line 36, and thus further improving the light transmittance of the display panel.

Figure 16:
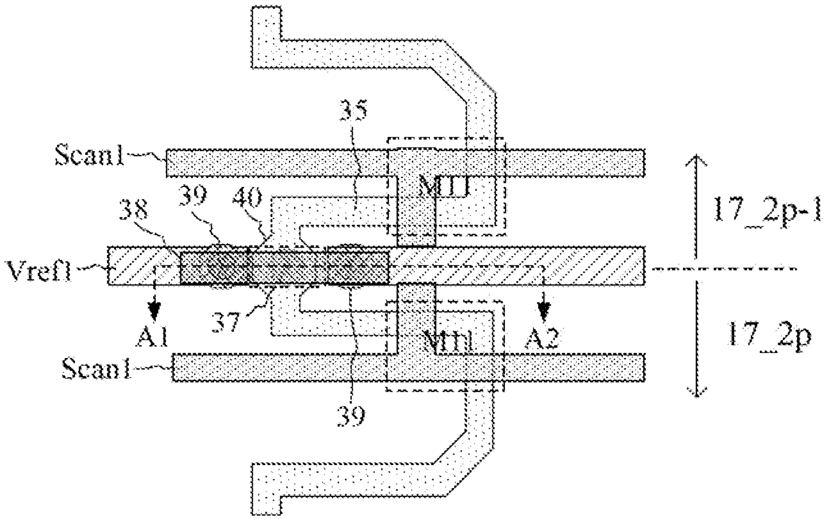
FIG. 16 is a schematic diagram of part of the layer structure in FIG. 15.
Figure 17:
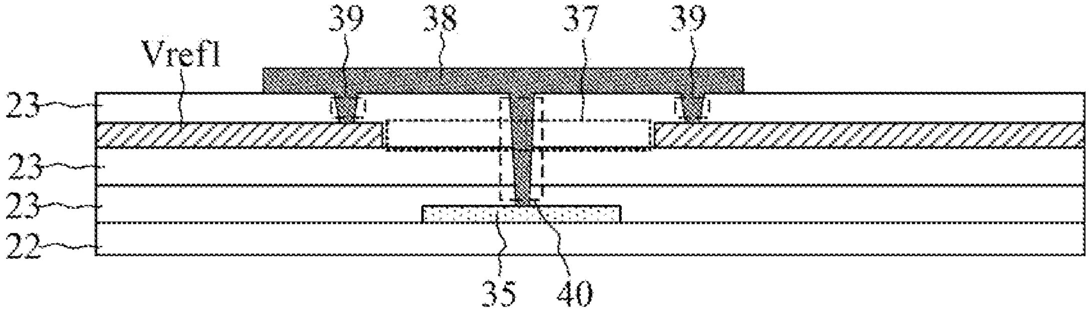
FIG. 17 is a sectional view taken along A1-A2 shown in FIG. 16.

FIG. 16 is a schematic diagram of part of the layer structure in FIG. 15, and FIG. 17 is a sectional view taken along A1-A2 shown in FIG. 16. In one or more embodiments, referring to FIG. 15, as shown in FIG. 16 and FIG. 17, the first reset signal line $V_{ref1}$ includes a first breaking 37, and in the direction perpendicular to the plane where the display panel is located, the first breaking 17 overlaps with the third connection line 35. That is, the first reset signal line $V_{ref1}$ is disconnected above the third connection line 35.

The display panel further includes a second connection wire 38. The second connection wire 38 is located at one side of the first reset signal line $V_{ref1}$ facing a light-exit surface of the display panel. The second connection wire 38 is electrically connected to a part of the first reset signal line $V_{ref1}$ located at each of two sides of the first breaking 37 through a third via-hole 39. The second connection wire 38 is further electrically connected to the third connection line 35 through a fourth via-hole 40. In the direction perpendicular to the plane where the display panel is located, the fourth via-hole 40 is located in the first breaking 37.

It can be understood that the layer structure of the display panel includes a semiconductor layer, a first metal layer, a second metal layer, and a third metal layer. The semiconductor layer may include structures such as a first semiconductor connection line 12. The first metal layer may include structures such as a first scanning signal line Scan1 and a second scanning signal line Scan2. The second metal layer may include structures such as a first reset signal line $V_{ref1}$, a second reset signal line $V_{ref2}$, and an electrode plate of a storage capacitor C in a pixel circuit 2. The third metal layer may include structures such as a second connection wire 38 and a power signal line PVDD.

In an existing manufacturing process of the display panel, generally, holes are formed between the third metal layer and the second metal layer and between the third metal layer and the semiconductor layer. For example, there is a need to form a via-hole between the third metal layer and the second metal layer to connect the power signal line PVDD and the electrode plate of the storage capacitor C.

In the design of a connection manner of the first reset signal line $V_{ref1}$ and the third connection line 35, if a via-hole is directly formed between the second metal layer where the first reset signal line $V_{ref1}$ is located and the semiconductor layer where the third connection line 35 is located, a new perforation flow is further required to be added on the basis of the original process flow. In some embodiments of the present disclosure, by use of the above "three-hole design" formed by two third via-holes 39 and one fourth via-hole 40, in the manufacturing process of the display panel, it is only required that the third via-hole 39 is synchronously formed between the second connection wire 38 and the first reset signal line $V_{ref1}$ when another via-hole is formed between the third metal layer and the second metal layer, and the fourth via-hole 40 is synchronously formed between the second connection wire 38 and the third connection line 35 when another hole is formed between the third metal layer and the semiconductor layer, which does not require any additional process flow and does not increase process costs.

Figure 18:
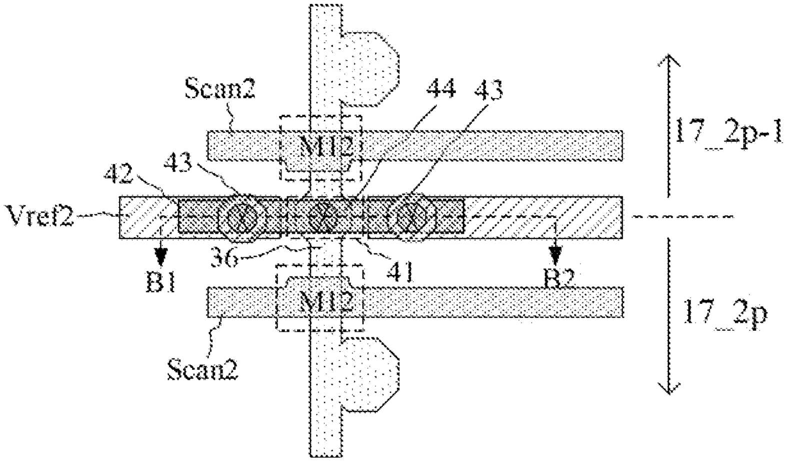
FIG. 18 is a schematic diagram of another part of the layer structure in FIG. 15.
Figure 19:
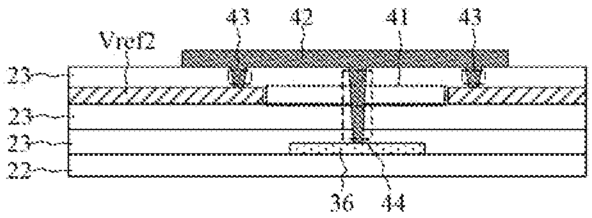
FIG. 19 is a sectional view taken along B1-B2 shown in FIG. 18.

FIG. 18 is a schematic diagram of another part of the layer structure in FIG. 15, and FIG. 19 is a sectional view taken along B1-B2 shown in FIG. 18. In one or more embodiments, referring to FIG. 15, as shown in FIG. 18 and FIG. 19, the second reset signal line $V_{ref2}$ includes a second breaking 41, and in the direction perpendicular to the plane where the display panel is located, the second breaking 41 overlaps with the fourth connection line 36. That is, the second reset signal line $V_{ref2}$ is disconnected above the fourth connection line 36.

The display panel further includes a third connection wire 42. The third connection wire 42 is located at one side of the second reset signal line $V_{ref2}$ facing a light-exit surface of the display panel. The third connection wire 42 is electrically connected to as part of the second reset signal line $V_{ref2}$ located at each of two sides of the second breaking 41 through a fifth via-hole 43. The third connection wire 42 is further electrically connected to the fourth connection line 36 through a sixth via-hole 44. In the direction perpendicular to the plane where the display panel is located, the sixth via-hole 44 is located in the second breaking 41.

Similar to the above arrangement, in the design of a connection manner of the second reset signal line $V_{ref2}$ and the fourth connection line 36, in some embodiments of the present disclosure, by use of "three-hole design" formed by two fifth via-holes 43 and one sixth via-hole 44, there is no need to add other perforation process flows to the manufacturing process of the display panel.

Figure 20:
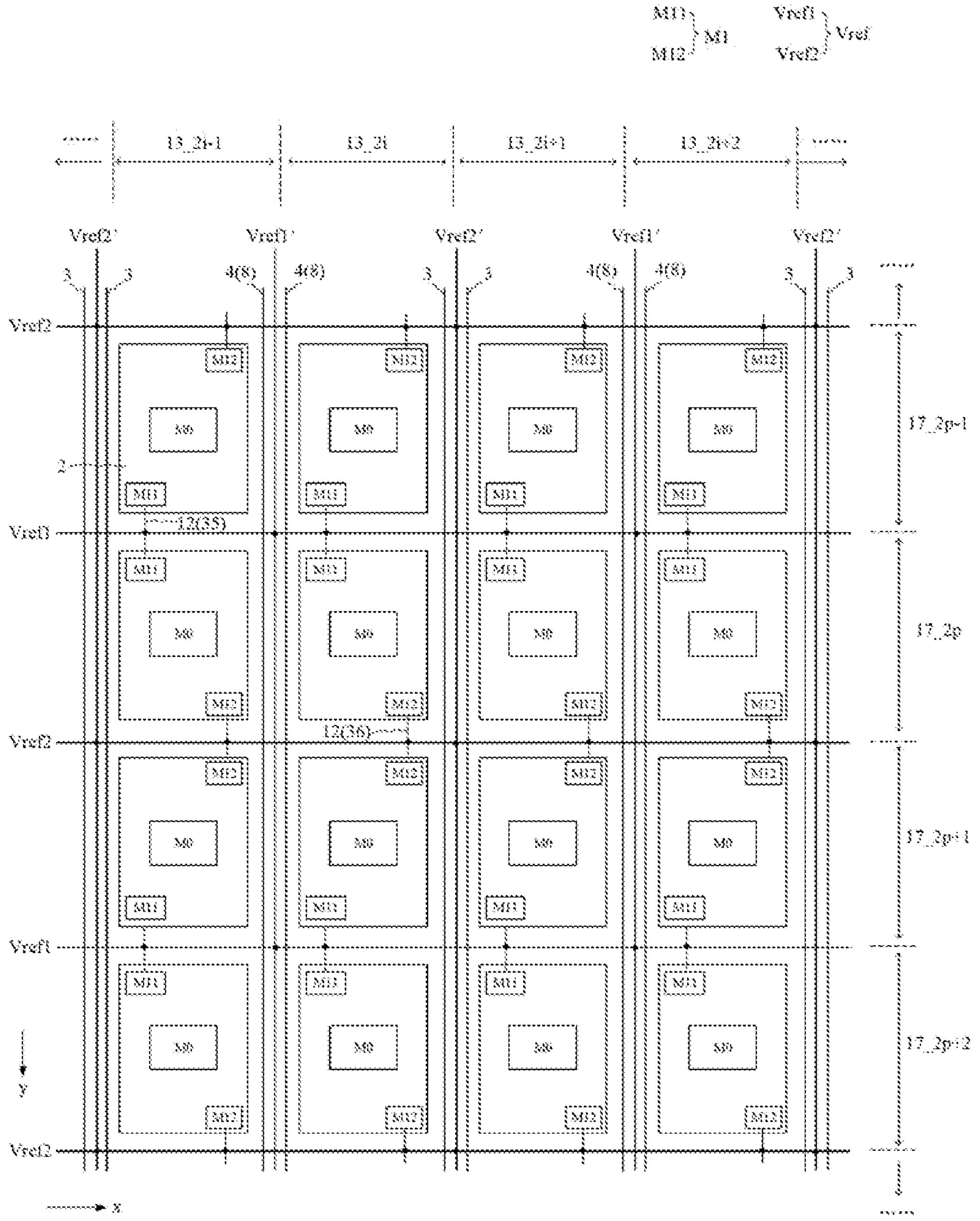
FIG. 20 is a schematic diagram of another partial structure of the display panel according to some embodiments of the present disclosure.

FIG. 20 is a schematic diagram of another partial structure of the display panel according to some embodiments of the present disclosure. In one or more embodiments, as shown in FIG. 20, the display panel further includes a first auxiliary reset signal line $V_{ref1}$, extending along the second direction y, the first auxiliary reset signal line $V_{ref1}$, being electrically connected to the first reset signal line $V_{ref1}$, and/or the display panel further includes a second auxiliary reset signal line $V_{ref2}$, extending along the second direction y, the second auxiliary reset signal line $V_{ref2}$ being electrically connected to the second reset signal line $V_{ref2}$.

The first auxiliary reset signal line $V_{ref1}$, crosses the first reset signal line $V_{ref1}$ to form a grid structure, and the second auxiliary reset signal line $V_{ref2}$, crosses the second reset signal line $V_{ref2}$ to form a grid structure, thereby effectively reducing a wiring load of the reset signal line $V_{ref}$ and reducing voltage drop of the reset voltage during transmission.

In some embodiments, the first auxiliary reset signal line $V_{ref1}$, and the second auxiliary reset signal line $V_{ref2}$, may be located between two adjacent pixel columns 13 respectively, and the first auxiliary reset signal line $V_{ref1}$, and the second auxiliary reset signal line $V_{ref2}$, are arranged alternately. Only one first auxiliary reset signal line $V_{ref1}$, or one second auxiliary reset signal line $V_{ref2}$, may be arranged between two adjacent pixel columns 13.

In addition, it is to be further noted that, in some embodiments of the present disclosure, when the pixel circuits 2 are designed with symmetric rows, referring to FIG. 15, two second scanning signal lines Scan2 may also be arranged at a junction of the $2n^{th}$ pixel row 17_2*n* and the (2n+1)th pixel row 17_2*n*+1 to be electrically connected to a gate of the second sub reset transistor M12, thereby shortening a connection distance between the second sub reset transistor M12 and the second scanning signal line Scan2.

Figure 21:
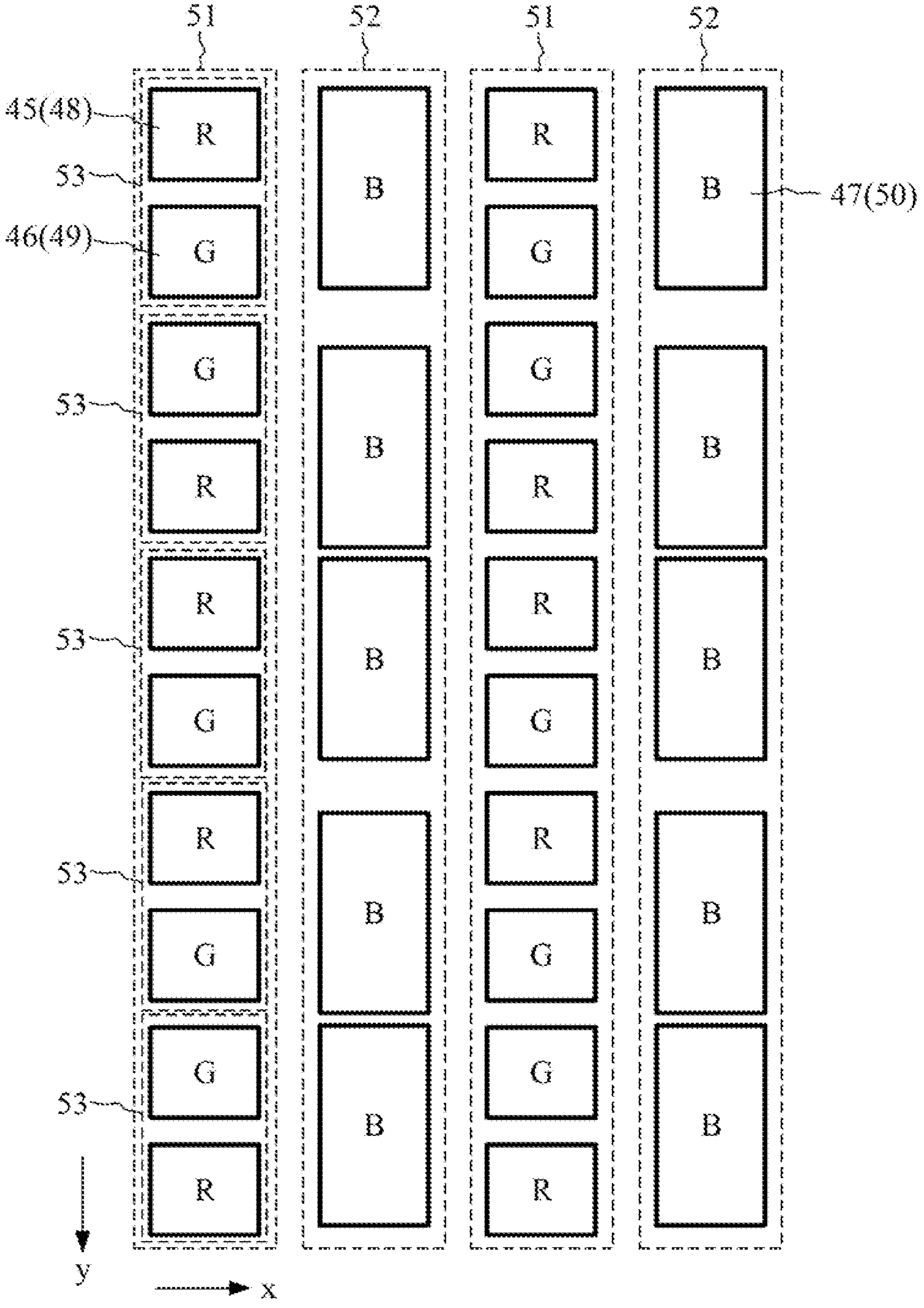
FIG. 21 is a schematic diagram of arrangement of the anode according to some embodiments of the present disclosure.
Figure 22:
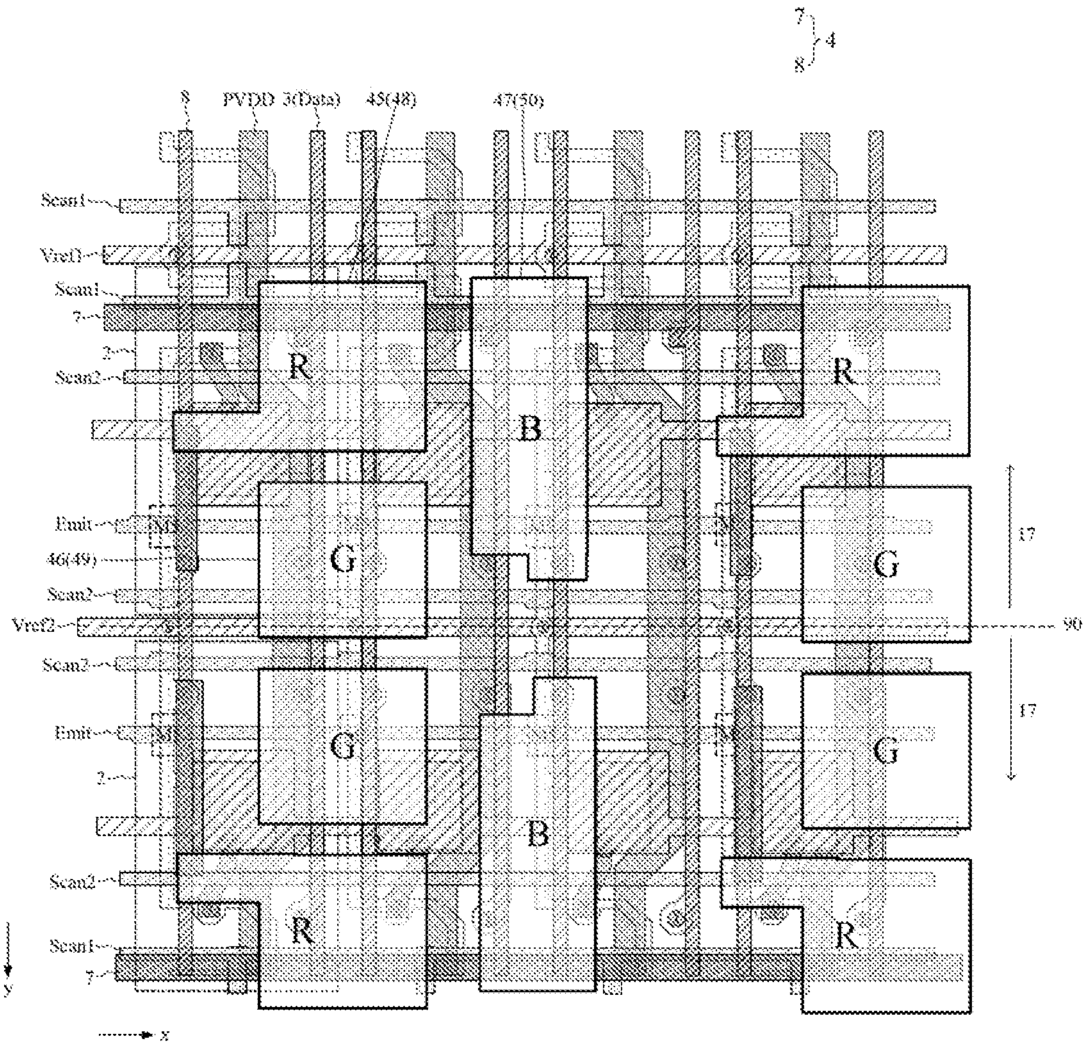
FIG. 22 is a schematic diagram of another layer structure of the display panel according to some embodiments of the present disclosure.

FIG. 21 is a schematic diagram of arrangement of the anode 10 according to some embodiments of the present disclosure, and FIG. 22 is a schematic diagram of another layer structure of the display panel according to some embodiments of the present disclosure. In one or more embodiments, as shown in FIG. 21 and FIG. 22, the light-emitting elements 9 include a red light-emitting element 45, a green light-emitting element 46, and a blue light-emitting element 47. The anodes 10 include a first anode 48 at the red light-emitting element 45, a second anode 49 at the green light-emitting element 46, and a third anode 50 at the blue light-emitting element 47.

The display panel further includes a first anode group 51 and a second anode group 52 arranged alternately along the first direction x. The first anode group 51 includes anode units 53 arranged along the second direction y. The anode units 53 each include one first anode 48 and one second anode 49. Moreover, the first anodes 48 or the second anodes 49 in two adjacent anode units 53 are adjacent. The second anode group 52 includes a plurality of third anodes 50 arranged along the second direction y.

Based on the above arrangement, in two adjacent anode units 53 of the first anode group 51, either two first anodes 48 are close to each other, or two second anodes 49 are close to each other. In this case, in the manufacturing process of the display panel, light-emitting layers above the two first anodes 48 close to each other can share an aperture in the mask for evaporation, and light-emitting layers above the two second anodes 49 close to each other can share an aperture in the mask for evaporation, which, compared with the manner in which one light-emitting layer only corresponds to one opening in the mask, can increase a light-emitting area, thereby increasing an aperture ratio.

In some embodiments, referring to FIG. 22 again, each pixel row 17 corresponds to one of the first connection signal lines 7, and two adjacent pixel rows 17 (as well as two first connection signal lines 7 corresponding to the two adjacent pixel rows 17) are symmetric to each other about a first symmetry axis 90. In the direction perpendicular to the plane where the display panel is located, only one of the first anode 48 and the second anode 49 overlaps with the first connection signal line 7.

Figure 23:
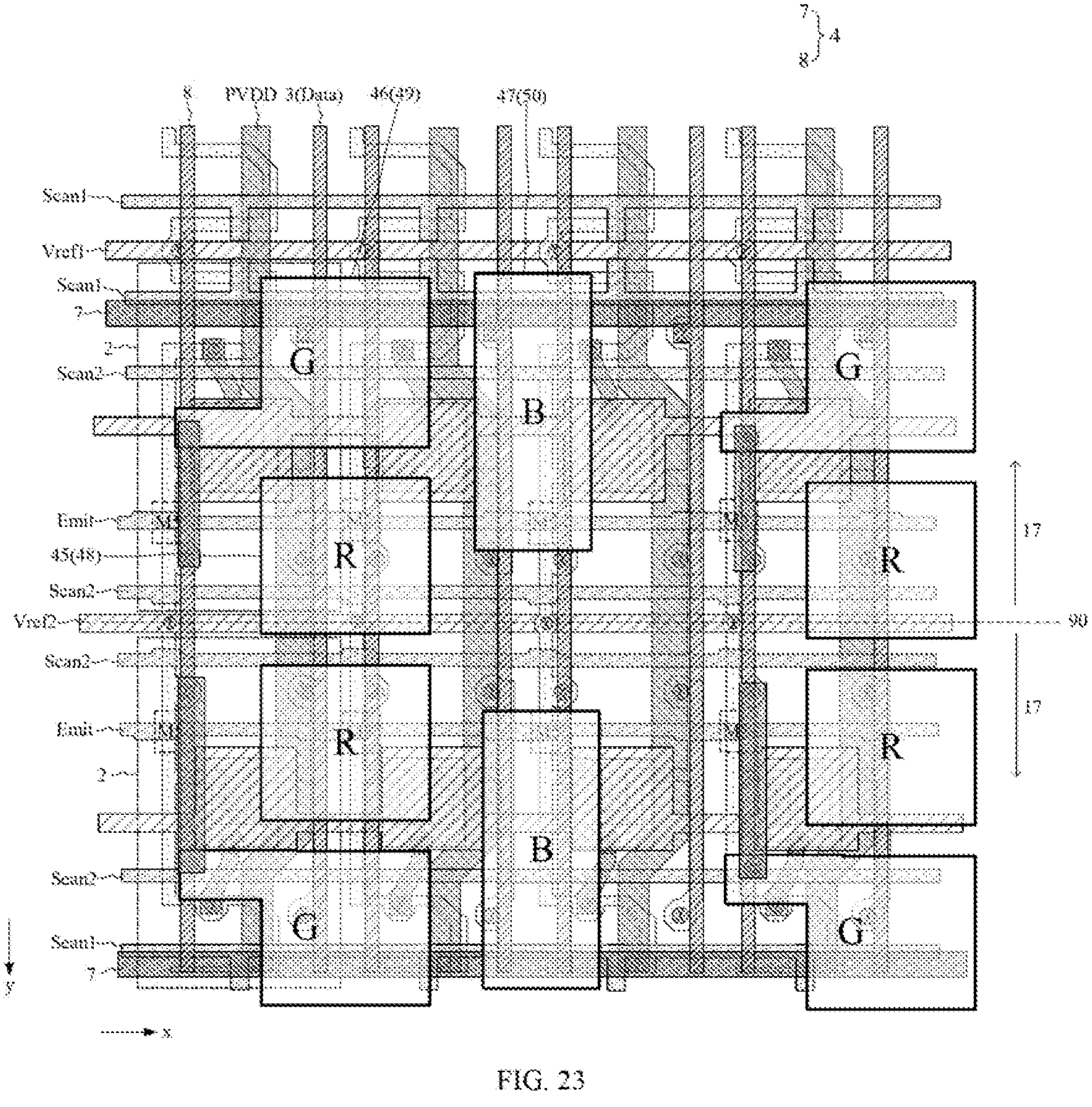
FIG. 23 is a schematic diagram of another layer structure of the display panel according to some embodiments of the present disclosure.

For example, referring to FIG. 22 again, in the direction perpendicular to the plane where the display panel is located, the first anode 48 overlaps with the first connection signal line 7, and the second anode 49 does not overlap with the first connection signal line 7. In some embodiments, as shown in FIG. 23, which is a schematic diagram of another layer structure of the display panel according to some embodiments of the present disclosure, the second anode 49 overlaps with the first connection signal line 7, and the first anode 48 does not overlap with the first connection signal line 7.

Figure 24:
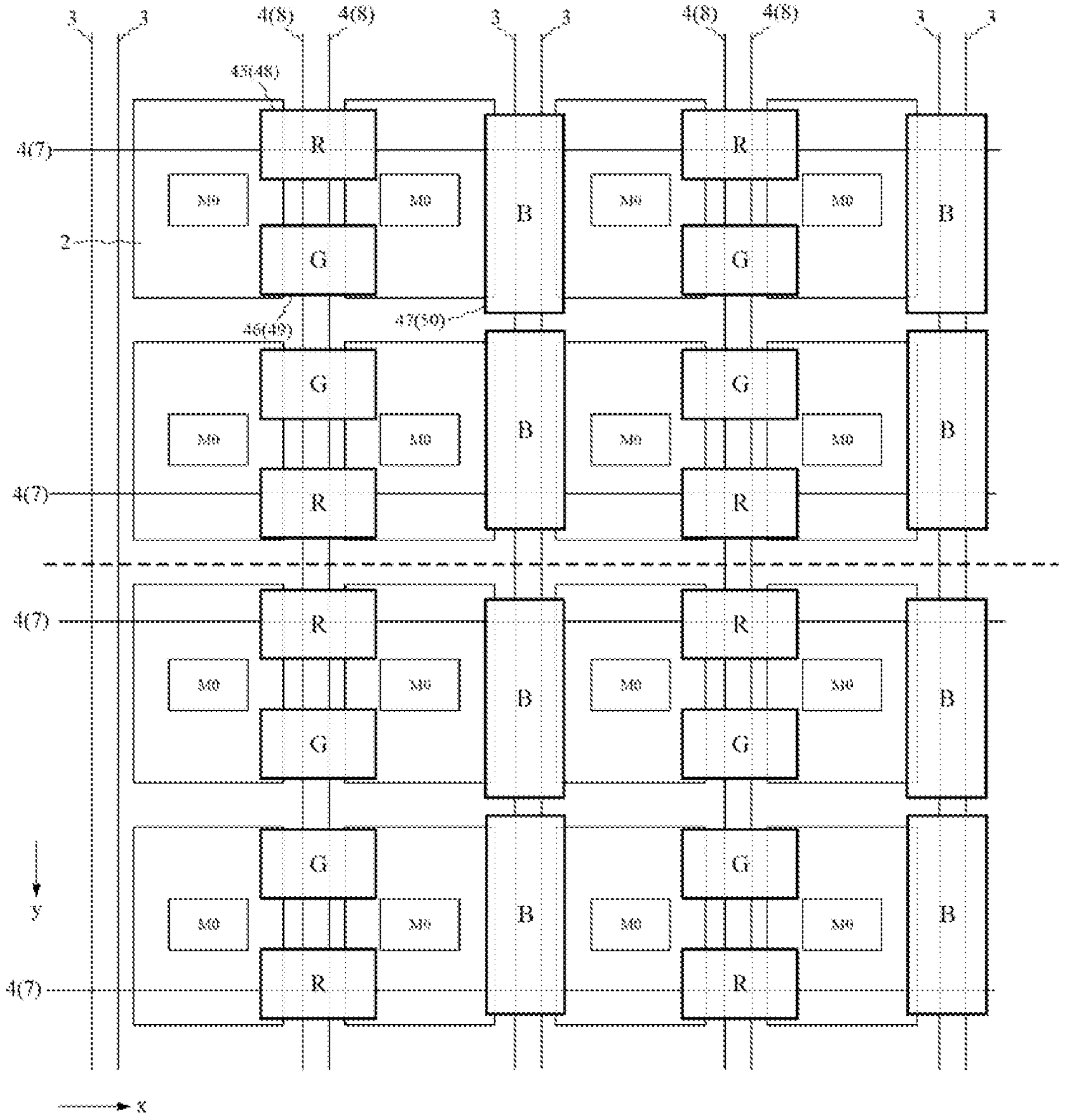
FIG. 24 is another schematic structural diagram of the display panel according to some embodiments of the present disclosure.

In some embodiments of the present disclosure, the arrangement of the anode 10 is also designed to match the arrangement of the pixel circuit 2. Referring to FIG. 22 and FIG. 23, the first connection signal line 7 is generally located at one side of the first scanning signal line Scan1. When the pixel circuits 2 are designed with symmetric rows, two first scanning signal lines Scan1 and two first connection signal lines 7 corresponding to two adjacent pixel rows 17 are also arranged symmetrically. For example, the first anode 48 overlaps with the first connection signal line 7. As shown in FIG. 24, which is another schematic structural diagram of the display panel according to some embodiments of the present disclosure, when two adjacent second anodes 49 are located between two corresponding first connection signal lines 7 corresponding to two adjacent pixel rows 17, the two adjacent second anodes 49 are far away from the first connection signal line 7, while the two adjacent first anodes 48 may overlap with the first connection signal lines 7.

When the first anode 48 does not overlap with the first connection signal line 7, the first anode 48 can avoid the via-hole between the first connection signal line 7 and the second connection signal line 8, thereby preventing an influence of the via-hole on the flatness of the first anode 48. When the second anode 49 does not overlap with the first connection signal line 7, the second anode 49 can avoid the via-hole between the first connection signal line 7 and the second connection signal line 8, thereby preventing an influence of the via-hole on the flatness of the second anode 49.

According to the above arrangement, the anodes 10 in the light-emitting elements 9 in a same color avoid the via-hole between the first connection signal lines 7 and the second connection signal lines 8, so that the flatness of the anode 10 in the light-emitting element 9 in this color is better, and color shift of this color can be ameliorated emphatically. For example, since green light is more easily visible to a human eye, the second anode 49 in the green light-emitting element 46 does not overlap with the first connection signal line 7, thereby emphatically ameliorating a color shift phenomenon of the green light.

Figure 25:
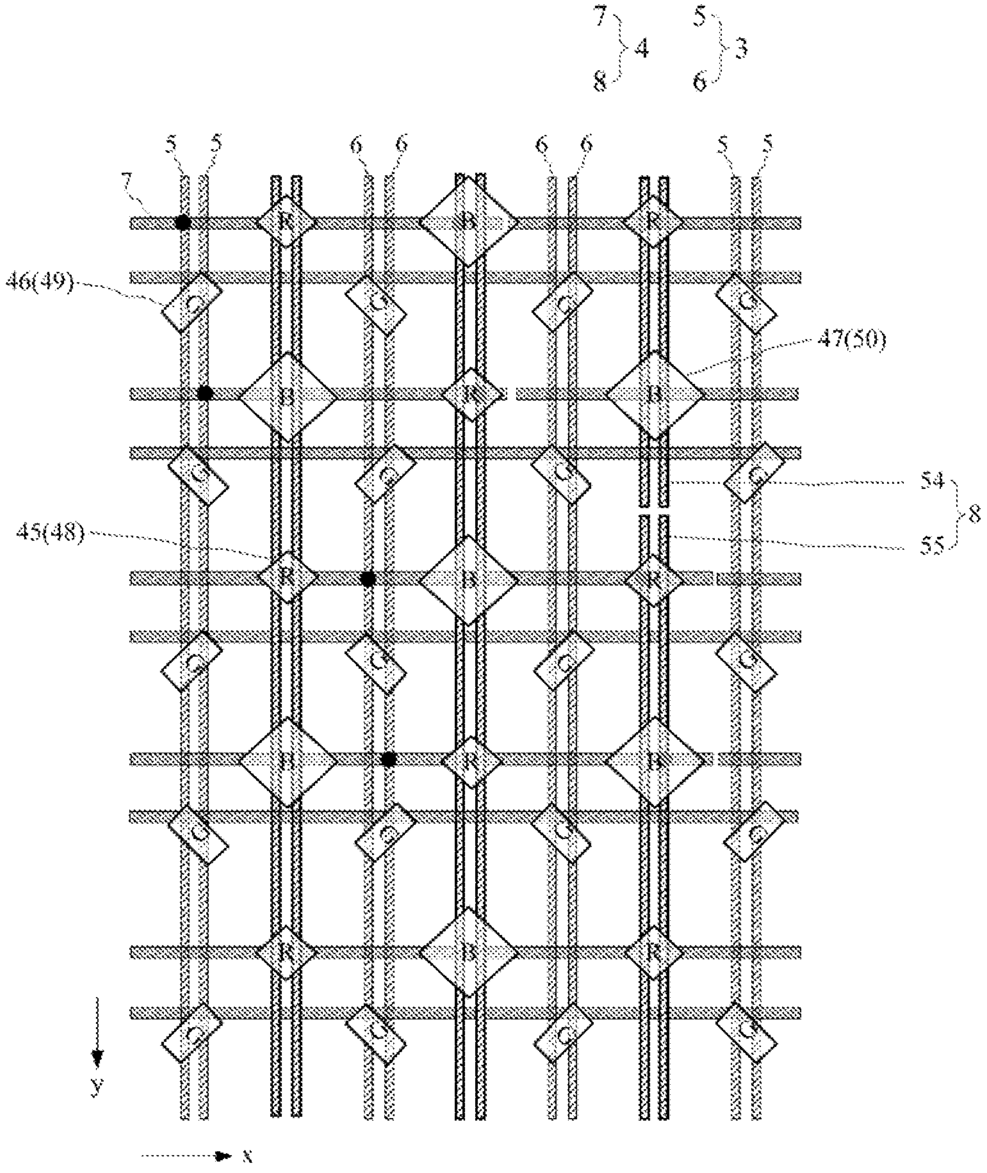
FIG. 25 is another schematic structural diagram of the display panel according to some embodiments of the present disclosure.

FIG. 25 is another schematic structural diagram of the display panel according to some embodiments of the present disclosure. In one or more embodiments, as shown in FIG. 25, at least part of the second connection signal lines 8 includes a first sub connection line segment 54 and a second sub connection line segment 55 arranged along the second direction y. A breaking exists between the first sub connection line segment 54 and the second sub connection line segment 55. The first sub connection line segment 54 is configured to receive a fixed voltage. For example, the first connection signal line 7 may be electrically connected to a negative power signal line in the display panel, and the second sub connection line segment 55 is electrically connected to the first connection signal line 7.

The light-emitting elements 9 include a red light-emitting element 45, a green light-emitting element 46, and a blue light-emitting element 47. In the direction perpendicular to the plane where the display panel is located, the anodes 10 (second anodes 49) in some of the green light-emitting elements 46 overlap with the first sub connection line segments 54 of two adjacent second connection signal lines 8.

In at least part of the second connection signal lines 8, the second sub connection line segment 55 is configured to be electrically connected to the indirect-connection signal line 5 through the first connection wire 7, while the first sub connection line segment 54 is configured to improve uniformity of reflection of the display panel at different positions. Green is more visible to the human eye, compared with red and blue. Therefore, in some embodiments of the present disclosure, through the arrangement of the second anodes 49 in part of the green light-emitting elements 46 above the first connection wire 31, potentials of the second anodes 49 can be stabilized by using the fixed voltage transferred on the first connection wire 31, thereby improving stability of the potentials of the second anodes 49, and thus helping to improve stability of light emission of this part of the green light-emitting elements 46.

Figure 26:
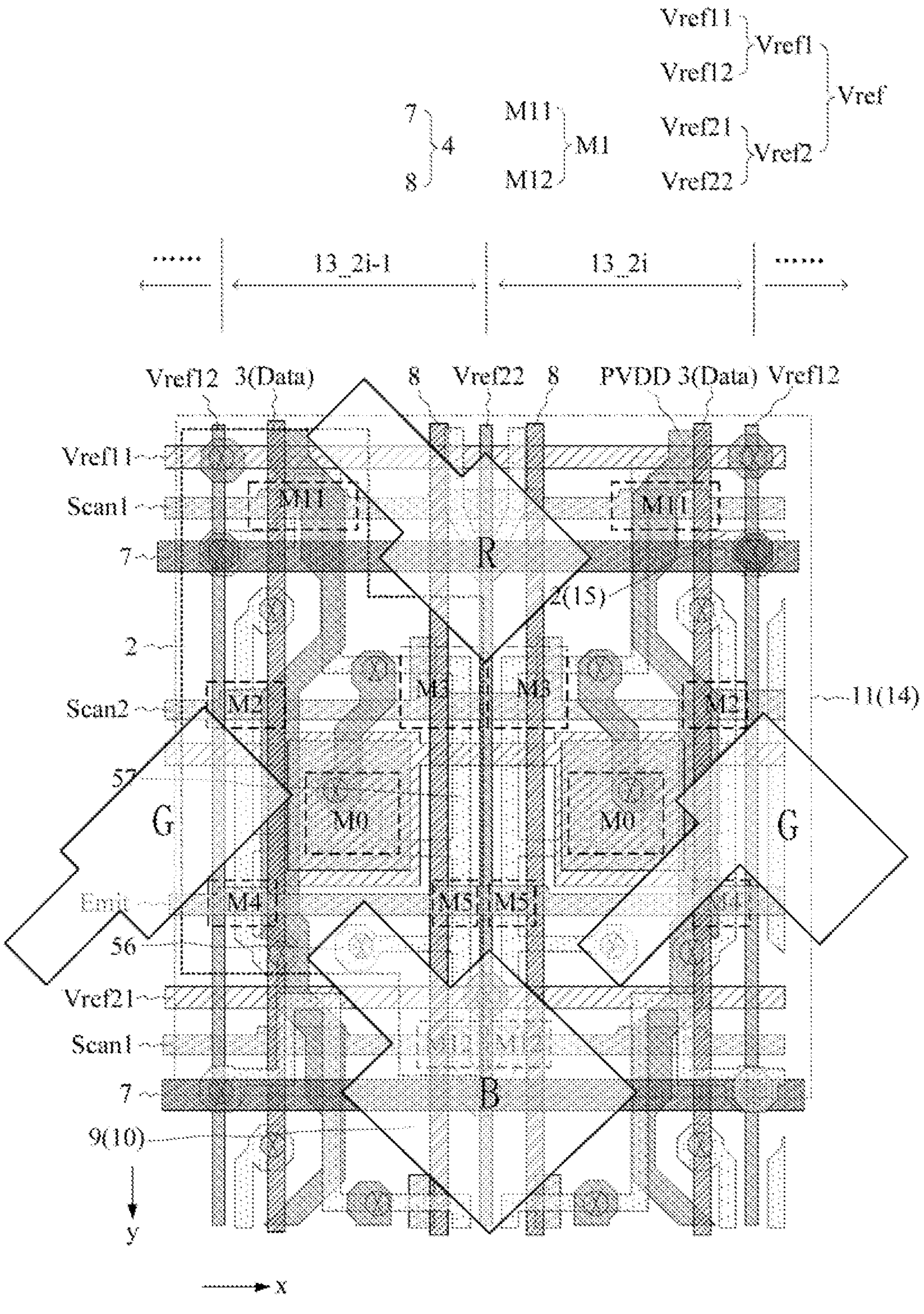
FIG. 26 is a schematic diagram of another layer structure of the display panel according to some embodiments of the present disclosure.
Figure 27:
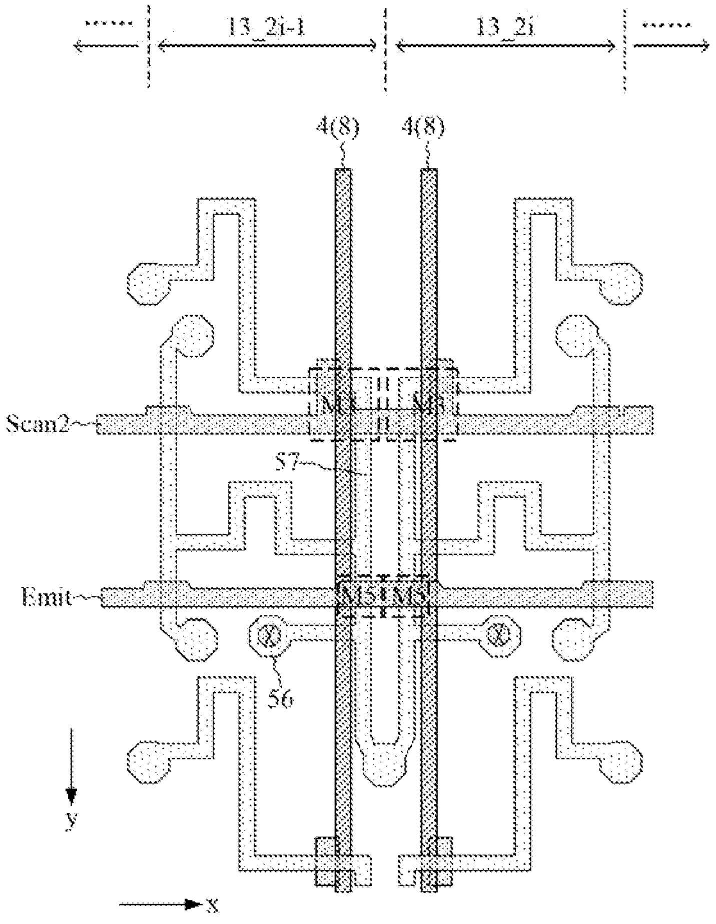
FIG. 27 is a schematic diagram of a layer structure of a threshold compensation transistor, a second light-emitting control transistor, and a second connection signal line according to some embodiments of the present disclosure.

FIG. 26 is a schematic diagram of another layer structure of the display panel according to some embodiments of the present disclosure, and FIG. 27 is a schematic diagram of a layer structure of a threshold compensation transistor M3, a second light-emitting control transistor M5, and a second connection signal line 8 according to some embodiments of the present disclosure. In some embodiments, as shown in FIG. 26 and FIG. 27, the pixel circuit group 11 includes a first pixel circuit group 14. The first pixel circuit group 14 includes two adjacent pixel circuits 2 in two adjacent pixel columns 13.

The pixel circuit 2 includes a threshold compensation transistor M3 and a second light-emitting control transistor M5. The second light-emitting control transistor M5 is electrically connected to the anode 10 of the light-emitting element 9 through an anode connection via-hole 56. The threshold compensation transistors M3 and the second light-emitting control transistors M5 in the (2n−1)th pixel column 13_2*n*−1 and the $2n^{th}$ pixel column 13_2*n* are adjacent. Two second connection signal lines 8 are arranged between the $(2n-1)^{th}$ pixel column 13_2*n*−1 and the $2n^{th}$ pixel column 13_2*n*.

The threshold compensation transistor M3 is electrically connected to the second light-emitting control transistor M5 through a third semiconductor connection line 57, and parts of two adjacent third semiconductor connection lines 57 extending along the second direction y are located between two adjacent second connection signal lines 8.

In the above arrangement, the second connection signal lines 8 and the parts of the third semiconductor connection lines 57 extending along the second direction y avoid each other, which can reduce mutual interference of signals transmitted on the second connection signal lines 8 and the third semiconductor connection lines 57, thereby preventing potential fluctuations on the third semiconductor connection lines 57 and improving stability of the driving current transferred from the second light-emitting control transistor M5 to the anode 10.

Figure 28:
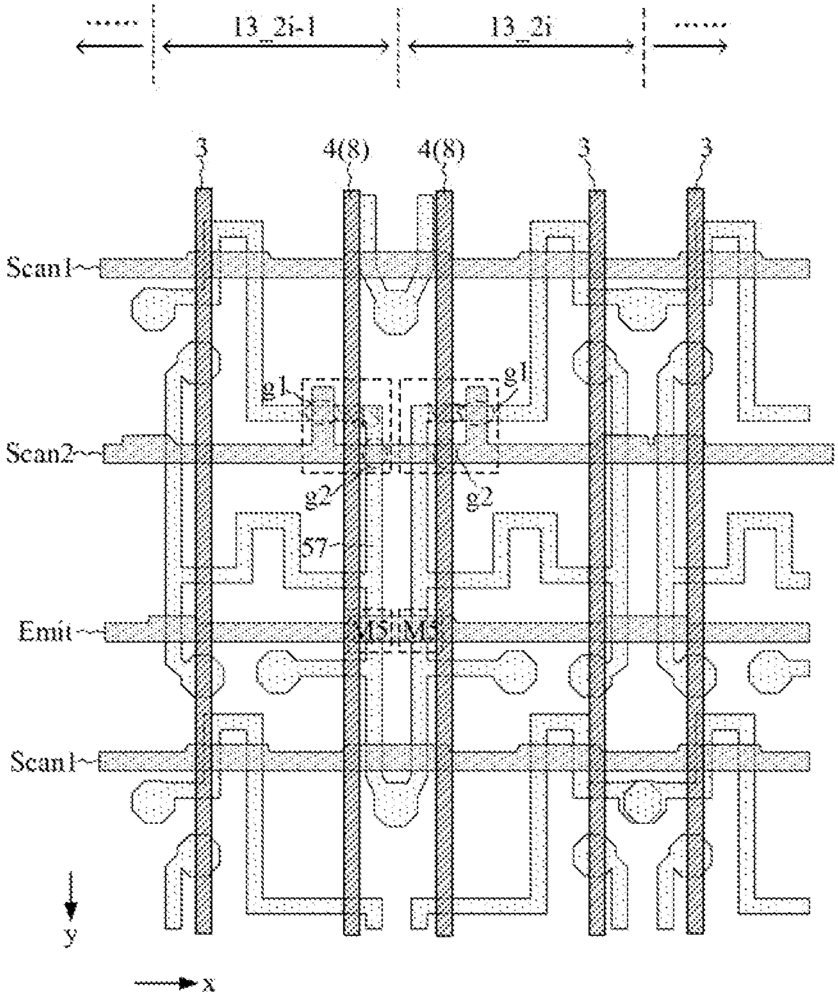
FIG. 28 is a schematic diagram of another layer structure of the threshold compensation transistor, the second light-emitting control transistor, and the second connection signal line according to some embodiments of the present disclosure.

FIG. 28 is a schematic diagram of another layer structure of the threshold compensation transistor M3, the second light-emitting control transistor M5, and the second connection signal line 8 according to some embodiments of the present disclosure. In some embodiments, as shown in FIG. 28, the threshold compensation transistor M3 includes a first gate g1 and a second gate g2. In this case, the threshold compensation transistor M3 is a double-gate transistor, and an off-state leakage current of the threshold compensation transistor M3 is relatively low, which can reduce an influence of the off-state leakage current of the threshold compensation transistor M3 on a gate potential of the drive transistor M0. The second connection signal line 8 is located between the first gate g1 and the second gate g2 of the threshold compensation transistor M3, thereby reducing an overlapping area between the second connection signal line 8 and the gate of the threshold compensation transistor M3, reducing an influence of a signal on the second connection signal line 8 on the gate potential of the threshold compensation transistor M3, and improving stability of an operating state of the threshold compensation transistor M3.

In addition, it is to be further noted that, under a condition that the second connection signal line 8 is located between the first gate g1 and the second gate g2 of the threshold compensation transistor M3, a distance between two adjacent second connection signal lines 8 may be equal or not equal to a distance between two adjacent first signal lines 3.

Figure 29:
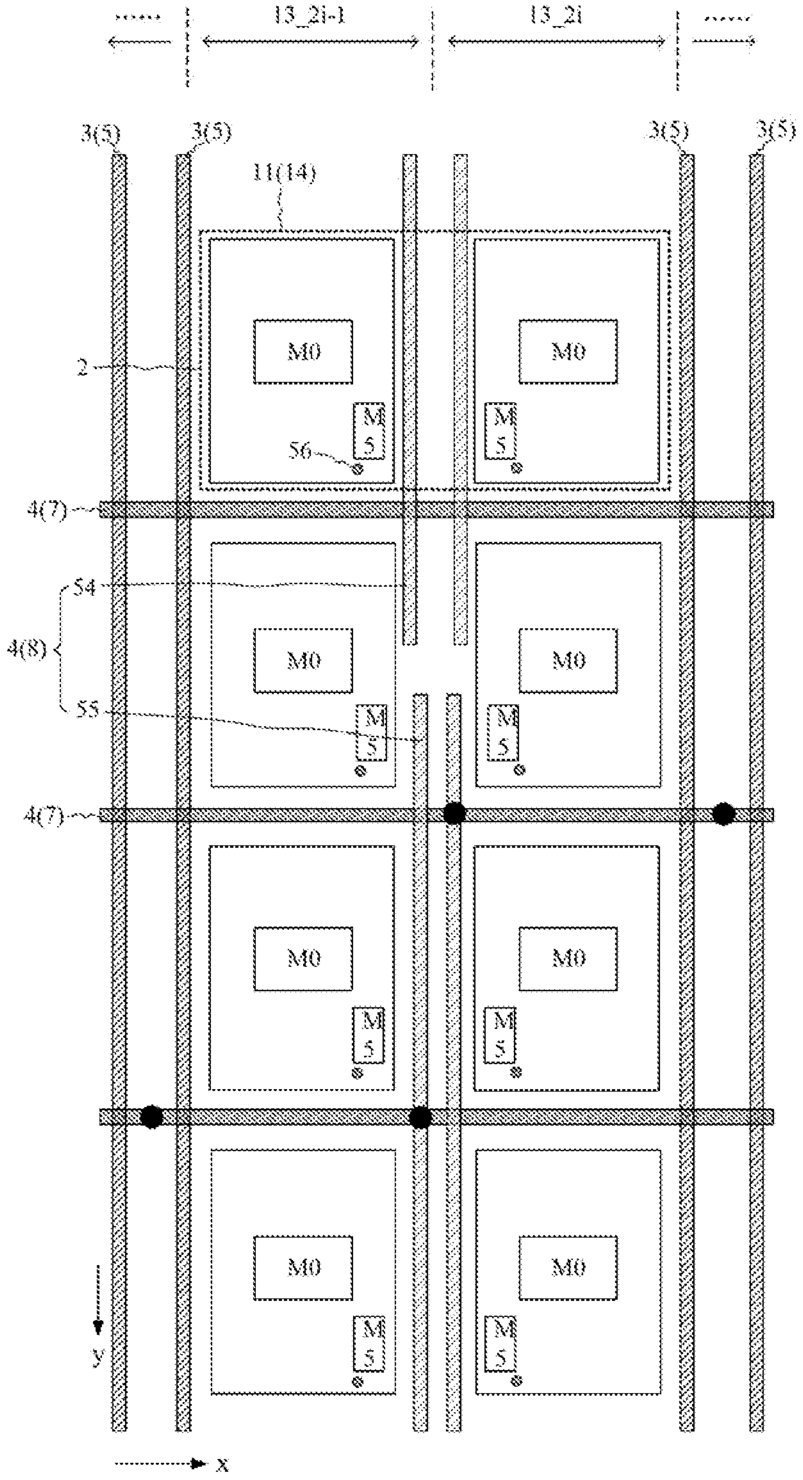
FIG. 29 is another schematic structural diagram of the display panel according to some embodiments of the present disclosure.

FIG. 29 is another schematic structural diagram of the display panel according to some embodiments of the present disclosure. In one or more some embodiments, as shown in FIG. 29, the pixel circuit group 11 includes a first pixel circuit group 14. The first pixel circuit group 14 includes two adjacent pixel circuits 2 in two adjacent pixel columns 13.

The second connection signal line 8 includes a first sub connection line segment 54 and a second sub connection line segment 55 arranged along the second direction y. A breaking exists between the first sub connection line segment 54 and the second sub connection line segment 55. The first sub connection line segment 54 is configured to receive a fixed voltage, and the second sub connection line segment 55 is electrically connected to the indirect-connection signal line 5.

The pixel circuit 2 includes a second light-emitting control transistor M5. The second light-emitting control transistor M5 is electrically connected to the anode 10 of the light-emitting element 9 through an anode connection via-hole 56. The second light-emitting control transistors M5 in the (2n−1)th pixel column 13_2*n*−1 and the $2n^{th}$ pixel column 13_2*n* are adjacent to each other. In the second connection signal line 8, a distance between the first sub connection line segment 54 and the anode connection via-hole 56 is smaller than a distance between the second sub connection line segment 55 and the anode connection via-hole 56.

When the pixel circuits 2 are designed with symmetric columns, the anode connection via-hole 56 may be close to the second connection signal line 8. Since the first sub connection line segment 54 of the second connection signal line 8 is configured to receive a fixed voltage, the first sub connection line segment 54 is closer to the anode connection via-hole 56, and stability of a node potential of the anode connection via-hole 56 can be improved by using the first sub connection line segment 54, thereby improving stability of the potential on the anode 10.

In addition, it is to be noted that, after adjustment of a position of the first sub connection line segment 54 of the second connection signal line 8, in one arrangement, a distance between the second sub connection line segments 55 of two adjacent second connection signal lines 8 may be smaller than a distance between two adjacent first signal lines 3, while a distance between the first sub connection line segments 54 of the two adjacent second connection signal lines 8 may be smaller than, equal to, or greater than a distance between the two adjacent first signal lines 3.

Figure 30:
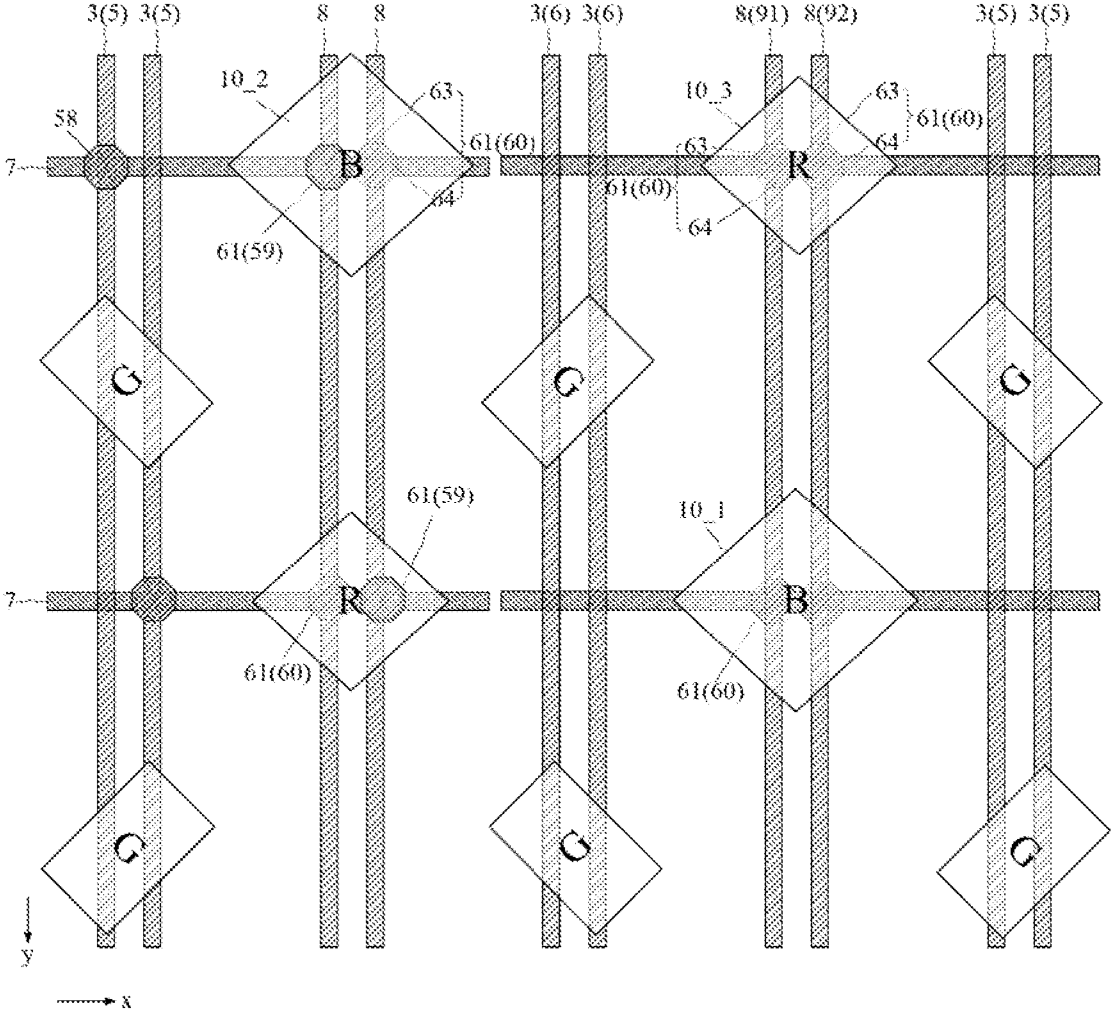
FIG. 30 is a schematic diagram of another layer structure of the display panel according to some embodiments of the present disclosure.

FIG. 30 is a schematic diagram of another layer structure of the display panel according to some embodiments of the present disclosure. In one or more embodiments, as shown in FIG. 30, the indirect-connection signal line 5 is electrically connected to the first connection signal line 7 through a first connection via-hole 58, and the first connection signal line 7 is electrically connected to the second connection signal line 8 through a second connection via-hole 59. It is to be noted that, in the layer structure of the display panel, when a via-hole is formed in a metal wire, in order to ensure reliability of the connection, a size at a position of the via-hole in the metal wire should be significantly larger than a size at a conventional position.

In the direction perpendicular to the plane where the display panel is located, at least part of the anodes 10 further overlaps with at least two first structures 61, the first structures 61 is located at one side of the anode 10 facing away from a light-exit surface of the display panel, and the first structures 61 each include a second connection via-hole 59 and/or a pad metal 60. A width of the pad metal 60 in the second direction y is greater than a line width of the first connection signal line 7, and a width of the pad metal 60 in the first direction x is greater than a line width of the second connection signal line 8.

In some embodiments of the present disclosure, when at least part of the anodes 10 overlaps with the at least two first structures 61, a raised area of the anode 10 can be increased by using the at least two first structures 61, thereby weakening the non-flatness of layer in different regions, thereby effectively improving flatness of the layer of this part of the anodes 10 and effectively ameliorating the color shift phenomenon.

It is to be noted that a shape of the anode 10 shown in FIG. 30 is only a schematic illustration. In other embodiments, the shape of the anode 10 may be a rounded rectangle, a circle, or the like.

Figure 31:
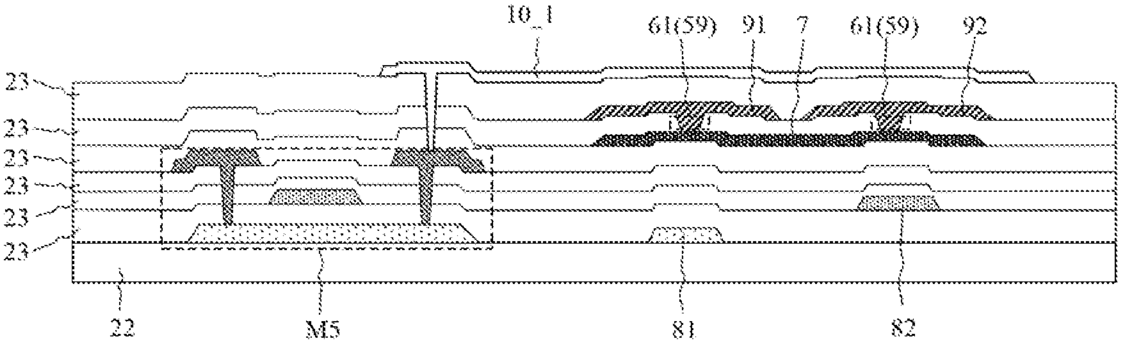
FIG. 31 is a schematic diagram of a layer stack of the display panel according to some embodiments of the present disclosure.

FIG. 31 is a schematic diagram of a layer stack of the display panel according to some embodiments of the present disclosure. In one or more embodiments, referring to FIG. 30 together with FIG. 31, the second connection signal lines 8 include a first-type second connection signal line 91 and a second-type second connection signal line 92 adjacent to each other. The first-type second connection signal line 91 and the second-type second connection signal line 92 are electrically connected to a same first connection signal line 7 through second connection via-holes 59. In the direction perpendicular to the plane where the display panel is located, part of the anodes 10 overlaps with the second connection via-holes 59 connected to the first-type second connection signal line 91 and the second-type second connection signal line 92. For clarity, this part of the anodes 10 in FIG. 30 and FIG. 31 is denoted by a reference sign 10_1.

In such a configuration, referring to FIG. 31, when a lower part of the anode 10_1 overlaps with part of a semiconductor wire 81 or a metal wire 82, this part of the semiconductor wire 81 or the metal wire 82 may locally raise the anode 10_1 in a small area, resulting in great non-flatness of layer at different positions of the anode 10_1. Based on the above arrangement, when part of the anodes 10 overlaps with at least two second connection via-holes 59, this part of metal film layer with a larger area of the first connection signal line 7 at the second connection via-hole 59 and this part of a metal film layer with a larger area of the first-type second connection signal line 91 and the second-type second connection signal line 92 at the second connection via-hole 59 can raise the anode 10_1 in a large area and uniformly, thereby effectively weakening the non-flatness of the layer of the anode 10_1 and improving flatness of the layer of this part of the anodes 10.

It is to be noted that, in an example in which the first signal line 3 is connected to a fan-out line, even if the first-type second connection signal line 91 and the second-type second connection signal line 92 are electrically connected to a same first connection signal line 7, in the design of the fan-out line, only one of the first-type second connection signal line 91 and the second-type second connection signal line 92 can be connected to the fan-out line. In this case, normal transmission of signals may not be affected.

In addition, the first-type second connection signal line 91 and the second-type second connection signal line 92 may also be connected to a plurality of first connection signal lines 7, so that more anodes 10 can overlap with two second connection via-holes 59. In this case, only one of the plurality of first connection signal lines 7 is required to have a connection relationship with the indirect-connection signal line 5. In this case, normal transmission of signals may not be affected, either.

Figure 32:
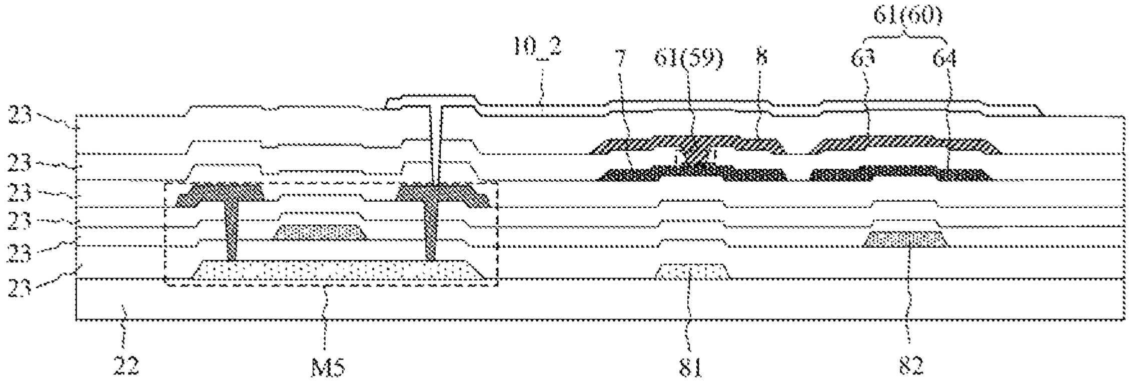
FIG. 32 is a schematic diagram of another layer stack of the display panel according to some embodiments of the present disclosure.

FIG. 32 is a schematic diagram of another layer stack of the display panel according to some embodiments of the present disclosure. In one or more embodiments, referring to FIG. 30 together with FIG. 32, in the direction perpendicular to the plane where the display panel is located, part of the anodes 10_2 overlaps with the second connection via-hole 59 and the pad metal 60, so as to simultaneously use this part of a metal film layer with a larger area of the first connection signal line 7 and the second connection signal line 8 at the second connection via-hole 59 and the pad metal 60 to raise this part of the anodes 10_2 in a large area and uniformly, thereby weakening the non-flatness of the layer of the anode 10_2, thereby improving the flatness of the layer of this part of the anodes 10. For clarity, this part of the anodes 10 in FIG. 30 and FIG. 32 is denoted by a reference sign 10_2.

Figure 33:
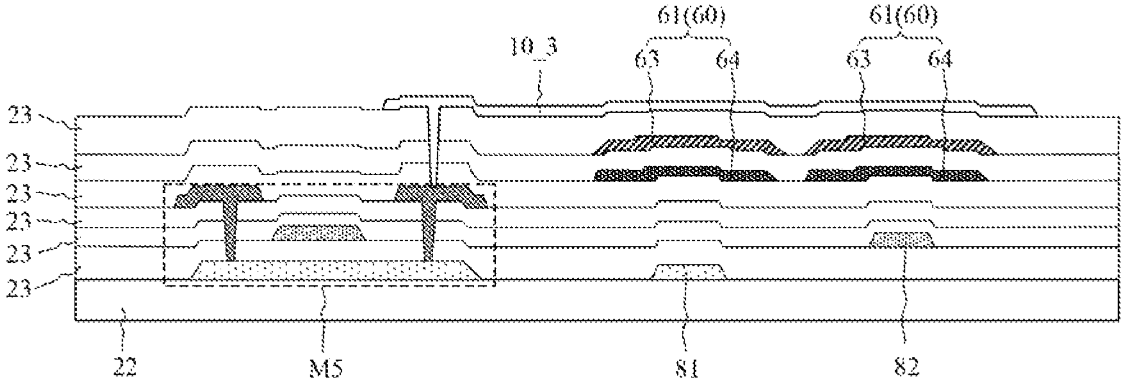
FIG. 33 is a schematic diagram of yet another layer stack of the display panel according to some embodiments of the present disclosure.

FIG. 33 is a schematic diagram of yet another layer stack of the display panel according to some embodiments of the present disclosure. In one or more embodiments, referring to FIG. 30 together with FIG. 33, in the direction perpendicular to the plane where the display panel is located, part of the anodes 10_3 does not overlap with the second connection via-hole 59 and overlaps with the pad metal 60, so as to use at least two pad metals 60 to raise this part of the anodes 10_3 in a large area and uniformly, thereby weakening the non-flatness of the layer of this part of the anodes 10_3. For clarity, this part of the anodes 10 in FIG. 30 and FIG. 33 is denoted by a reference sign 10_3.

In some embodiments, referring to FIG. 32 and FIG. 33 again, the pad metal 60 includes a first metal pad 63 and a second metal pad 64, the first metal pad 63 is arranged in a same layer as the second connection signal line 8, and the second metal pad 64 is arranged in a same layer as the first connection signal line 7.

With the arrangement, on the one hand, the first pad metal 60 and the second connection signal line 8 are formed by a same patterning process, and the second pad metal 60 and the first connection signal line 7 are formed by a same patterning process, thereby simplifying the process flow; and on the other hand, when part of the anodes 10 overlaps with the second connection via-hole 59, a total layer thickness of the first pad metal 60 and the second pad metal 60 is consistent with a layer thickness of the second connection signal line 8 and the first connection signal line 7, thereby enabling the surface of this part of the anodes 10 flatter.

Figure 34:
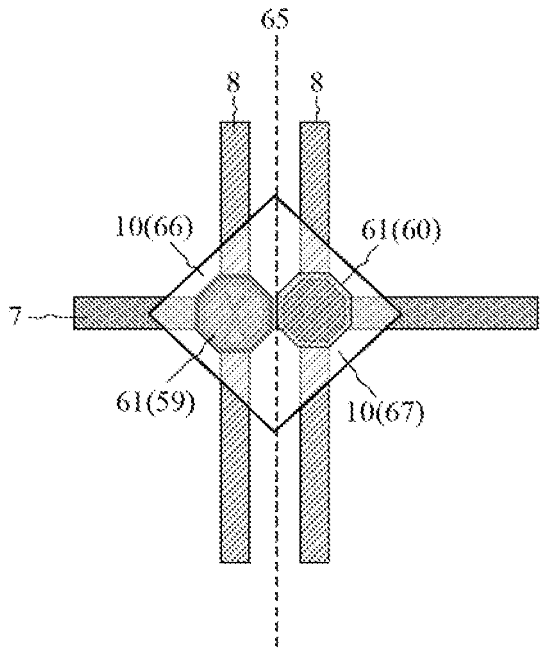
FIG. 34 is a schematic diagram of overlapping of the anode with first structures according to some embodiments of the present disclosure.
Figure 35:
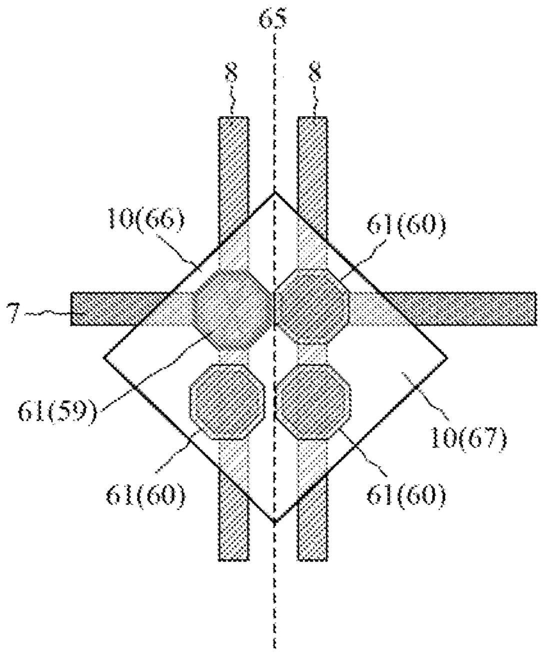
FIG. 35 is another schematic diagram of overlapping of the anode with the first structures according to some embodiments of the present disclosure.

FIG. 34 is a schematic diagram of overlapping of the anode 10 with first structures 61 according to some embodiments of the present disclosure, and FIG. 35 is another schematic diagram of overlapping of the anode 10 with the first structures 61 according to some embodiments of the present disclosure. In one or more embodiments, as shown in FIG. 34 and FIG. 35, in the direction perpendicular to the plane where the display panel is located, the anode 10 is symmetric about a second symmetry axis 65, the anode 10 is divided into a first part 66 and a second part 67 by the second symmetry axis 65, and a number of the first structures 61 overlapping with the first part 66 is equal to a number of the first structures 61 overlapping with the second part 67. In this case, the first part 66 and the second part 67 symmetric with each other in the anode 10 overlap with a same number of first structures 61 overall heights of the two parts tend to be the same, and the flatness of the anode 10 is better.

Figure 36:
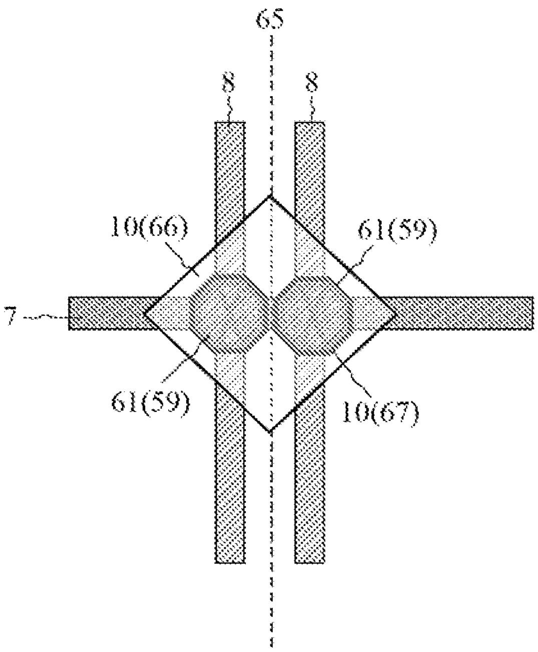
FIG. 36 is yet another schematic diagram of overlapping of the anode with the first structures according to some embodiments of the present disclosure.
Figure 37:
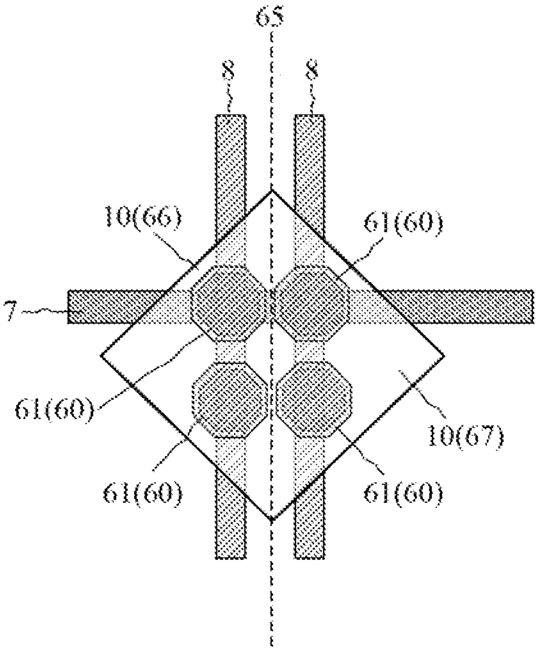
FIG. 37 is still another schematic diagram of overlapping of the anode with the first structures according to some embodiments of the present disclosure.

FIG. 36 is yet another schematic diagram of overlapping of the anode 10 with the first structures 61 according to some embodiments of the present disclosure, and FIG. 37 is still another schematic diagram of overlapping of the anode 10 with the first structures 61 according to some embodiments of the present disclosure. In one or more embodiments, as shown in FIG. 36 and FIG. 37, in the direction perpendicular to the plane where the display panel is located, the anode 10 is symmetric about a second symmetry axis 65, and orthographic projections of the at least two first structures 61 overlapping with the anode 10 are symmetric about the second symmetry axis 65, thereby further improving the flatness of the layer of the anode 10.

In one or more embodiments, referring to FIG. 35 and FIG. 37 again, a number of first structures 61 overlap with the anode 10 is m, where m≥4, so that the anode 10 overlaps with a sufficient number of first structures 61, and more positions of the anode 10 are raised, enabling the surface of the anode 10 to be flatter.

It is to be noted that, the overlapping of the anode 10 with the first structures 61 illustrated in the drawings of some embodiments of the present disclosure is only a schematic illustration, which does not represent a limitation on the number of the second connection via-holes 59 and the pad metals 60 overlapping with the anode 10. In some other embodiments of the present disclosure, the anode 10 may also overlap with another number of second connection via-holes 59 and another number of pad metals 60.

Figure 38:
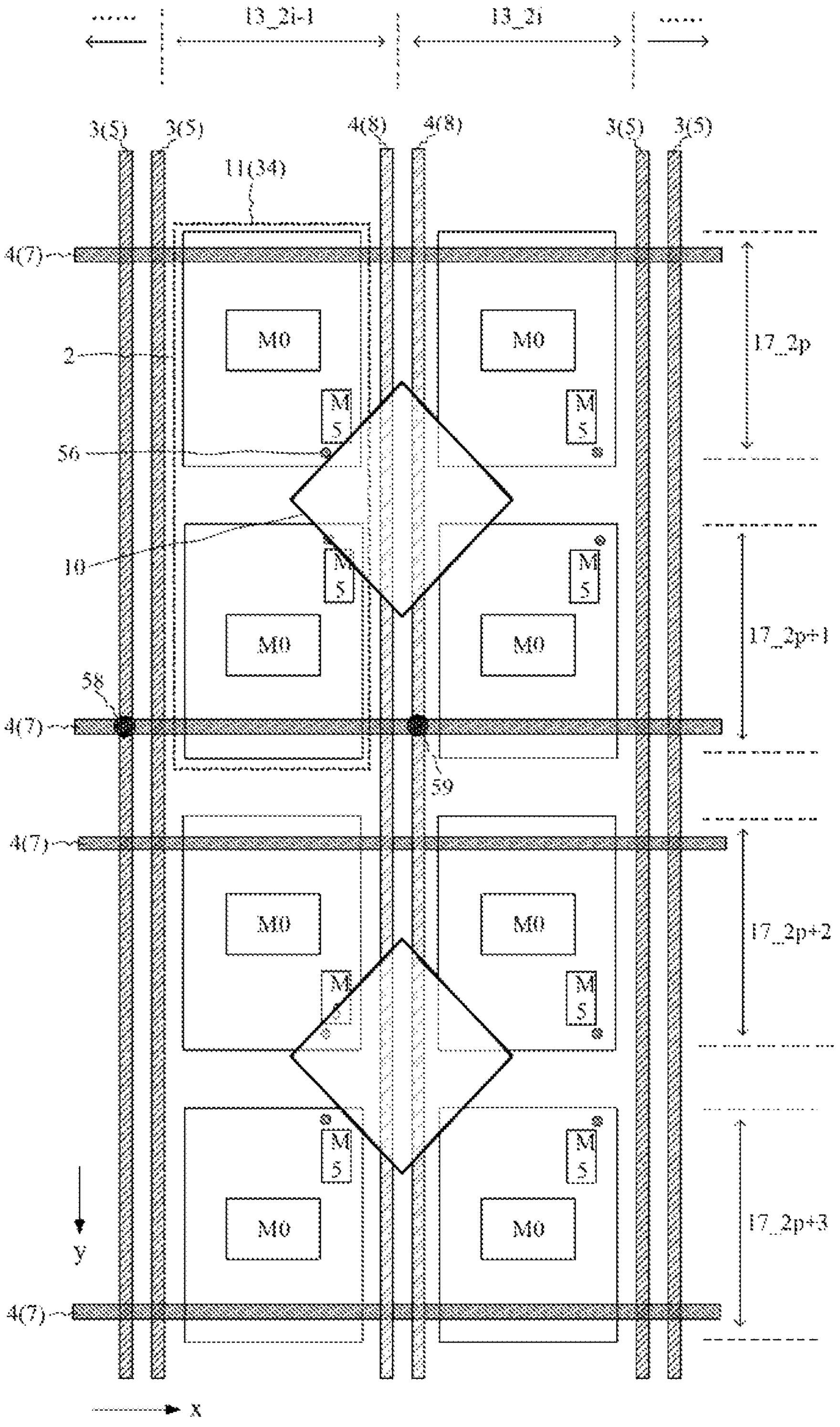
FIG. 38 is another schematic structural diagram of the display panel according to some embodiments of the present disclosure.

FIG. 38 is another schematic structural diagram of the display panel according to some embodiments of the present disclosure. In one or more embodiments, as shown in FIG. 38, the pixel circuit 2 includes a second light-emitting control transistor M5. The second light-emitting control transistor M5 is electrically connected to the anode 10 of the light-emitting element 9 through an anode connection via-hole 56.

The display panel further includes a plurality of pixel rows 17 arranged along the second direction y. The pixel rows 17 each include a plurality of pixel circuits 2 arranged along the first direction x. The pixel circuit group 11 includes a second pixel circuit group 34. The second pixel circuit group 34 includes two adjacent pixel circuits 2 in two adjacent pixel rows 17. The second light-emitting control transistors M5 in the $2n^{th}$ pixel row 17_**2*n* and the $(2n+1)^{th}$ pixel row 17_2*n*+1** are adjacently arranged, where n is a positive integer.

The indirect-connection signal line 5 is electrically connected to the first connection signal line 7 through the first connection via-hole 58. The first connection signal line 7 is electrically connected to the second connection signal line 8 through the second connection via-hole 59. The second connection via-hole 59 is close to a junction of the (2n−1)th pixel row 17_**2*n*−1 and the $2n^{th}$ pixel row 17_2*n*. In the direction perpendicular to the plane where the display panel is located, at least part of the anodes 10 does not overlap with the second connection via-hole 59**.

When the pixel circuits 2 are designed with symmetric rows, the anode connection via-holes 56 between the second light-emitting control transistor M5 and the anode 10 are arranged in a relatively concentrated manner. In the design of the second connection via-hole 59, to avoid the anode connection via-hole 56, the second connection via-hole 59 is arranged at a position far away therefrom, and then at least part of the anodes 10 can avoid the second connection via-hole 59, thereby preventing an influence of the second connection via-hole 59 on the flatness of the anode 10.

Figure 39:
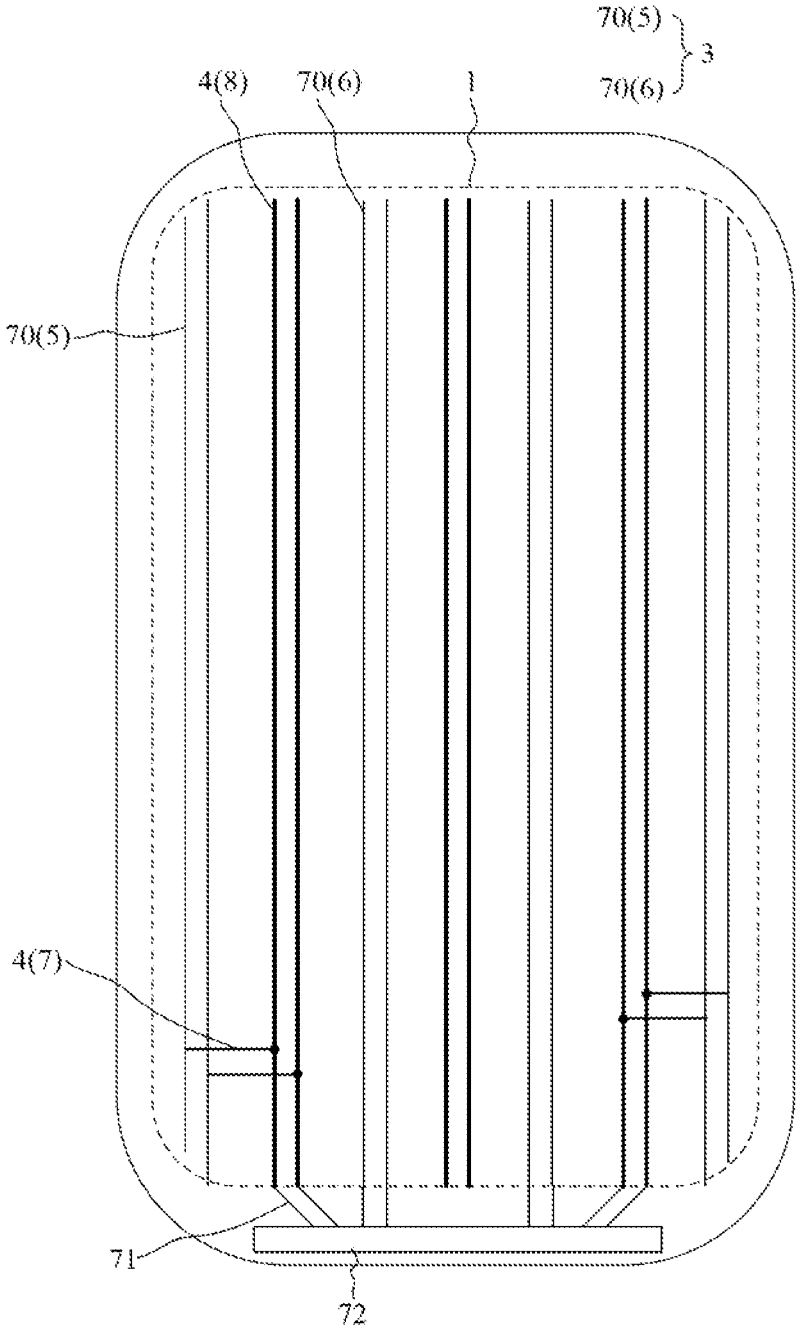
FIG. 39 is another schematic structural diagram of the display panel according to some embodiments of the present disclosure.

FIG. 39 is another schematic structural diagram of the display panel according to some embodiments of the present disclosure. In one or more embodiments, as shown in FIG. 39, the first signal line 3 includes a first-type first signal line 70. In the first-type first signal line 70, the indirect-connection signal line 5 is located at each of two sides of the direct-connection signal line 6 in the first direction x, and the second connection signal line 8 connected to the indirect-connection signal line 5 is located at one side of the indirect-connection signal line 5 close to the direct-connection signal line 6, so as to lead the indirect-connection signal line 5 to the middle of the display region 1. Then, in the arrangement of fan-out lines 71, the fan-out lines 71 can be concentrated in a region directly facing a driver chip 72, thereby reducing a width of a corner bezel and optimizing the design of a narrow bezel.

Figure 40:
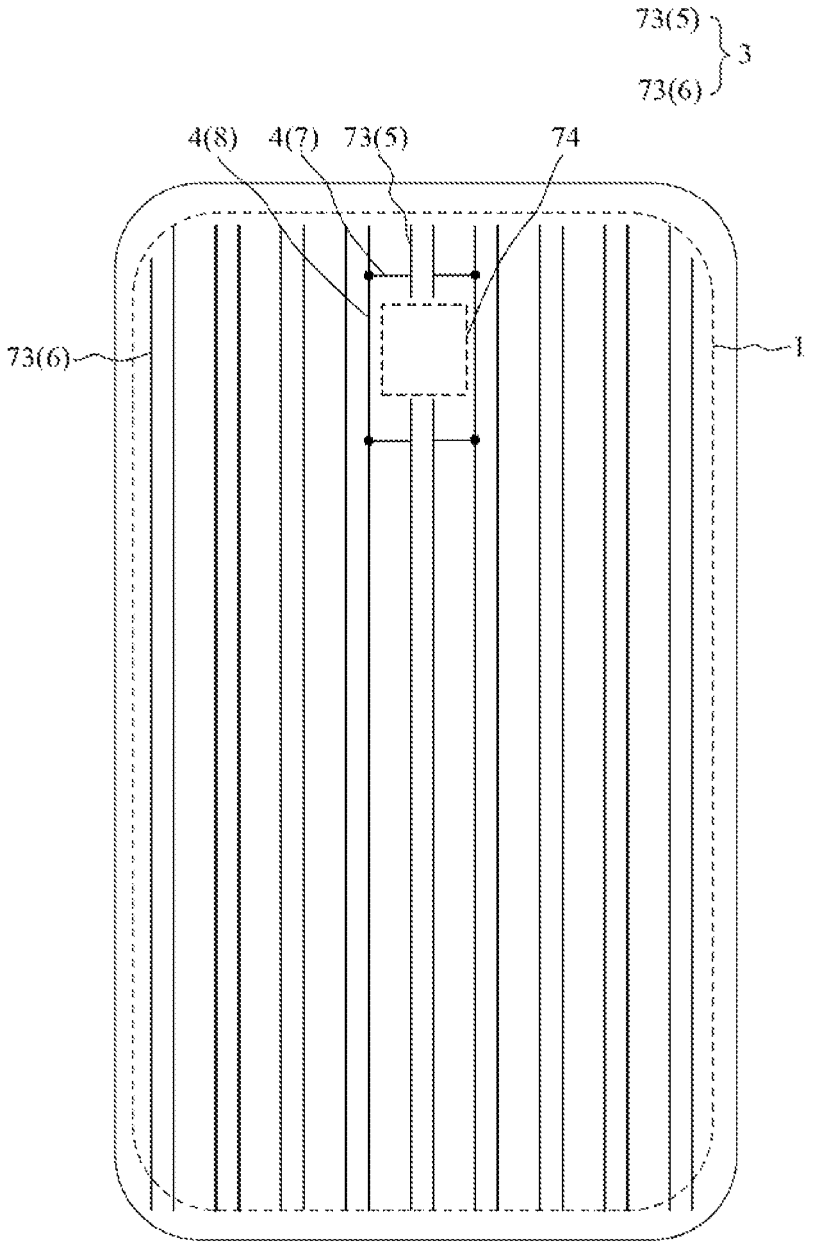
FIG. 40 is another schematic structural diagram of the display panel according to some embodiments of the present disclosure.

FIG. 40 is another schematic structural diagram of the display panel according to some embodiments of the present disclosure. In one or more embodiments, as shown in FIG. 40, the display region 1 includes an opening 74. The first signal line 3 includes a second-type first signal line 73. In the second-type first signal line 73, part of the indirect-connection signal line 5 is located at each of two sides of the opening 74 in the first direction x, and the indirect-connection signal line 5 at each of two sides of the opening 74 is electrically connected to each other through a connection signal line 4, to form a continuous signal transmission path.

In one or more embodiments, the first signal line 3 includes a data line Data and/or a power signal line PVDD. When the first signal line 3 includes the data line Data, the data line Data can adopt the connection manner shown in FIG. 39. When the first signal line 3 includes the power signal line PVDD, the power signal line PVDD can adopt the connection manner shown in FIG. 40.

It is to be noted that, when the first signal line 3 includes the data line, referring to FIG. 5, the pixel circuit 2 further includes a data write transistor M2. The data write transistor M2 is electrically connected to the data line Data. When the pixel circuits 2 are designed with symmetric columns, the data line Data is located between the drive transistors M0 in the $2n^{th}$ pixel column 13_**2*n* and the $(2n+1)^{th}$ pixel column 13_2*n*+1, and at the same time, the data write transistors M2 in the $2n^{th}$ pixel column 13_2*n* and the (2n+1)th pixel column 13_2*n*+1 are adjacently arranged, so that positions of the data write transistors M2** match the data line Data.

In some embodiments of the present disclosure, a structure and an operating principle of the pixel circuit are described by taking the circuit structure shown in FIG. 2 as an example.

For example, the pixel circuit may include a drive transistor M0, a first sub reset transistor M11, a second sub reset transistor M12, a data write transistor M2, a threshold compensation transistor M3, a first light-emitting control transistor M4, a second light-emitting control transistor M5, and a storage capacitor C.

A gate of the first sub reset transistor M11 is electrically connected to the first scanning signal line Scan1, a first electrode of the first sub reset transistor M11 is electrically connected to the first reset signal line $V_{ref1}$, and a second electrode of the first sub reset transistor M11 is electrically connected to a gate of the drive transistor M0. The first sub reset transistor M11 is configured to reset the gate of the drive transistor M0 when turned on.

A gate of the second sub reset transistor M12 is electrically connected to the second scanning signal line Scan2, a first electrode of the second sub reset transistor M12 is electrically connected to the second reset signal line $V_{ref2}$, and a second electrode of the second sub reset transistor M12 is electrically connected to the anode of the light-emitting element 9. The second sub reset transistor M12 is configured to reset the anode of the light-emitting element 9 when turned on.

A gate of the data write transistor M2 and a gate of the threshold compensation transistor M3 are electrically connected to the second scanning signal line Scan2, a first electrode of the data write transistor M2 is electrically connected to the data line Data, a second electrode of the data write transistor M2 is electrically connected to a first electrode of the drive transistor M0, a first electrode of the threshold compensation transistor M3 is electrically connected to a second electrode of the drive transistor M0, and a second electrode of the threshold compensation transistor M3 is electrically connected to the gate of the drive transistor M0. The data write transistor M2 and the threshold compensation transistor M3 are configured to charge the gate of the drive transistor M0 when turned on and perform threshold compensation thereon.

A gate of the first light-emitting control transistor M4 and a gate of the second light-emitting control transistor M5 are electrically connected to a light-emitting control signal line Emit, a first electrode of the first light-emitting control transistor M4 is electrically connected to the power signal line PVDD, a second electrode of the first light-emitting control transistor M4 is electrically connected to the first electrode of the drive transistor M0, a first electrode of the second light-emitting control transistor M5 is electrically connected to the second electrode of the drive transistor M0, and a second electrode of the second light-emitting control transistor M5 is electrically connected to the anode of the light-emitting element 9. The first light-emitting control transistor M4 and the second light-emitting control transistor M5 are configured to transmit a driving current converted by the drive transistor M0 to the light-emitting element 9 when turned on, to drive the light-emitting element 9 to emit light.

Figure 41:
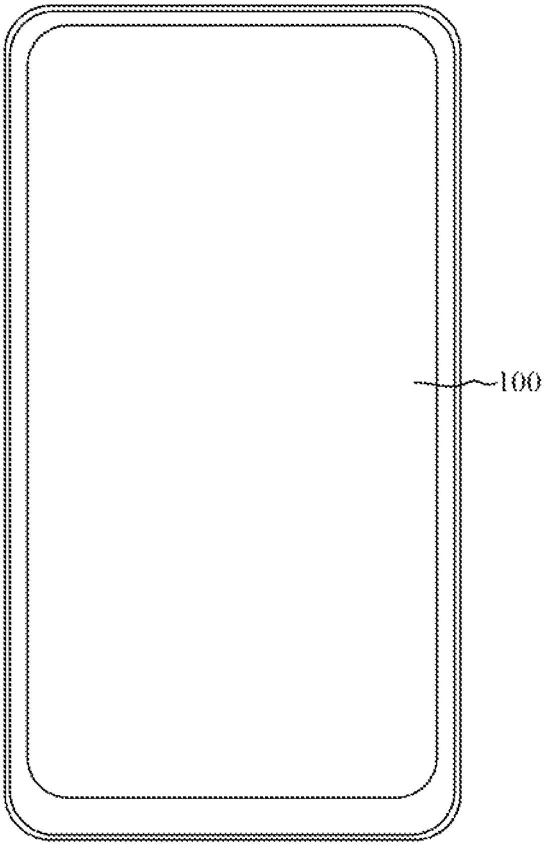
FIG. 41 is a schematic structural diagram of a display device according to some embodiments of the present disclosure.

Based on a same inventive concept, some embodiments of the present disclosure further provide a display device. FIG. 41 is a schematic structural diagram of a display device according to some embodiments of the present disclosure. As shown in FIG. 41, the display device includes the display panel 100 described above. A structure of the display panel 100 has been described in detail in the above embodiments, and details will not be described herein again. Certainly, the display device shown in FIG. 41 is only a schematic illustration, and the display device may be any electronic device with a display function such as a mobile phone, a tablet computer, a notebook computer, an e-book, or a television.

The above-described embodiments are merely preferred embodiments of the present disclosure and are not intended to limit the present disclosure. Any modifications, equivalent substitutions and improvements made within the principle of the present disclosure shall fall into the protection scope of the present disclosure.

Finally, it should be noted that the above-described embodiments are merely for illustrating the present disclosure but not intended to provide any limitation. Although the present disclosure has been described in detail with reference to the above-described embodiments, it should be understood by those skilled in the art that, it is still possible to modify the technical solutions described in the above embodiments or to equivalently replace some or all of the technical features therein, but these modifications or replacements do not cause the essence of corresponding technical solutions to depart from the scope of the present disclosure.

What is claimed is:

1. A display panel comprising:

a display region;

pixel circuits located in the display region, each pixel circuit of the pixel circuits comprising a drive transistor and a first reset transistor that is electrically connected to a reset signal line;

first signal lines located in the display region, the first signal lines comprising an indirect-connection signal line and a direct-connection signal line;

connection signal lines located in the display region, at least part of the connection signal lines being electrically connected to the indirect-connection signal line, wherein the connection signal lines comprise a first connection signal line extending along a first direction and a second connection signal line extending along a second direction, the second direction intersecting the first direction;

light-emitting elements located in the display region, each light emitting element of the light-emitting elements comprising an anode;

a pixel circuit group, the pixel circuit group comprising two pixel circuits at least partially symmetric with and adjacent to each other, and the first reset transistors of the two pixel circuits in the pixel circuit group being adjacent to each other and being connected to each other through a first semiconductor connection line, wherein the first semiconductor connection line being connected to the reset signal line; and pixel columns arranged along the first direction, each pixel column of the pixel columns comprising pixel circuits arranged along the second direction, two sides of the drive transistors in one pixel column of the pixel columns in the first direction being provided with two first signal lines and two second connection signal lines, and in a direction perpendicular to a plane where the display panel is located, at least one of the anodes overlapping with two adjacent first signal lines, or at least one of the anodes overlapping with two adjacent second connection signal lines, or at least one of the anodes overlapping with two adjacent first signal lines while at least another one of the anodes overlapping with two adjacent second connection signal lines.

2. The display panel according to claim 1, wherein the pixel circuit group comprises a first pixel circuit group, the first pixel circuit group comprising two adjacent pixel circuits in two adjacent pixel columns;

wherein the first reset transistor comprises a first sub reset transistor and a second sub reset transistor, the reset signal line comprises a first reset signal line electrically connected to the first sub reset transistor and a second reset signal line electrically connected to the second sub reset transistor;

wherein the first semiconductor connection line comprises a first connection line and a second connection line;

wherein the second sub reset transistors in a $(2n-1)^{th}$ pixel column and a $2n^{th}$ pixel column are adjacently arranged, two adjacent second sub reset transistors are connected to each other through the second connection line, and the second connection line is electrically connected to the second reset signal line; and wherein the first sub reset transistors in the $2n^{th}$ pixel column and a $(2n+1)^{th}$ pixel column are adjacently arranged, two adjacent first sub reset transistors are connected to each other through the first connection line, and the first connection line is electrically connected to the first reset signal line, where n is a positive integer.

3. The display panel according to claim 2, wherein the first reset signal line comprises a first sub reset line and a second sub reset line electrically connected to each other, the second reset signal line comprises a third sub reset line and a fourth sub reset line electrically connected to each other, wherein the first sub reset line and the third sub reset line each extend along the first direction, and wherein the second sub reset line and the fourth sub reset line each extend along the second direction;

wherein the second sub reset line and the fourth sub reset line are arranged alternately, the second sub reset line and the fourth sub reset line adjacent to each other are spaced by one pixel column of the pixel columns, and the fourth sub reset line is located between the $(2n-1)^{th}$ pixel column and the $2n^{th}$ pixel column;

wherein the first connection line is electrically connected to the second sub reset line, and the second connection line is electrically connected to the fourth sub reset line, wherein the display panel comprises pixel rows arranged along the second direction, wherein the pixel rows comprising pixel circuits arranged along the first direction; and wherein the first sub reset line and the third sub reset line are arranged alternately, and the first sub reset line and the third sub reset line that are adjacent to each other are spaced by the drive transistors in one pixel row of the pixel rows.

4. The display panel according to claim 2, further comprising pixel rows arranged along the second direction, the pixel rows each comprising pixel circuits arranged along the first direction;

wherein the first reset signal line extends along the first direction, and one pixel row of the pixel rows corresponds to one first reset signal line, the second reset signal line extends along the second direction, and the second reset signal line is located between the $(2n-1)^{th}$ pixel column and the $2n^{th}$ pixel column, wherein the first sub reset transistor is further electrically connected to a first scanning signal line, and the first connection line and the first reset signal line connected thereto are located at a same side of the first scanning signal line.

5. The display panel according to claim 1, wherein the pixel circuit group comprises a first pixel circuit group, the first pixel circuit group comprises two adjacent pixel circuits in two adjacent pixel columns, and the first signal line is located between the drive transistors in a $2n^{th}$ pixel column and a $(2n+1)^{th}$ pixel column;

wherein one of the pixel circuits further comprises a first light-emitting control transistor electrically connected to a power signal line, the power signal line extends along the second direction, wherein the first light-emitting control transistors in the $2n^{th}$ pixel column and the $(2n+1)^{th}$ pixel column are adjacent to each other, and the two power signal lines respectively connected to the $2n^{th}$ pixel column and the $(2n+1)^{th}$ pixel column are adjacent to each other;

wherein the display panel further comprises an auxiliary power connection line, the auxiliary power connection line is located at one side of the first signal line and the second connection signal line facing away from a light-exit surface of the display panel, the auxiliary power connection line comprises a first line segment and a first bearing portion, the first bearing portion is electrically connected to the power signal line, a size of the first bearing portion in the second direction is greater than a size of the first line segment in the second direction, and in the direction perpendicular to the plane where the display panel is located, the first bearing portion overlaps with two adjacent first signal lines; and a part of the first signal line overlapping with the first bearing portion is a first wiring segment, and in the direction perpendicular to the plane where the display panel is located, part of the anodes overlaps with two adjacent first wiring segments.

6. The display panel according to claim 5, wherein the auxiliary power connection line further comprises a second bearing portion, a size of the second bearing portion in the second direction is greater than the size of the first line segment in the second direction, and in the direction perpendicular to the plane where the display panel is located, the second bearing portion overlaps with two adjacent second connection signal lines; and wherein a part of the second connection signal line overlapping with the second bearing portion is a second wiring segment, and in the direction perpendicular to the plane where the display panel is located, part of the anodes overlaps with two adjacent second wiring segments.

7. The display panel according to claim 5, wherein a gate of the drive transistor is electrically connected to a first node; and wherein the auxiliary power connection line further comprises a first protruding portion protruding from the first line segment, and in the direction perpendicular to the plane where the display panel is located, the first protruding portion overlaps with the first node.

8. The display panel according to claim 5, wherein adjacent first light-emitting control transistors in the $2n^{th}$ pixel column and the $(2n+1)^{th}$ pixel column are connected to each other through a second semiconductor connection line;

wherein the power signal line comprises second line segments, and two adjacent second line segments of the second line segments are spaced apart from each other;

wherein the first bearing portion comprises a main body portion and a protruding portion, and in two adjacent power signal lines, end portions of the second line segments close to the protruding portion are connected to each other through a first connection wire, the second semiconductor connection line is electrically connected to the first connection wire through a first via-hole, and the first connection wire is electrically connected to the protruding portion through a second via-hole, and wherein in the direction perpendicular to the plane where the display panel is located, the first via-hole does not overlap with the second via-hole.

9. The display panel according to claim 1, further comprising pixel rows arranged along the second direction, wherein the pixel rows each comprise pixel circuits arranged along the first direction, the pixel circuit group comprises a second pixel circuit group, and the second pixel circuit group comprises two adjacent pixel circuits in two adjacent pixel rows;

wherein the first reset transistor comprises a first sub reset transistor and a second sub reset transistor, the reset signal line comprises a first reset signal line electrically connected to the first sub reset transistor and a second reset signal line electrically connected to the second sub reset transistor;

wherein the first semiconductor connection line comprises a third connection line and a fourth connection line;

wherein the first sub reset transistors in a $(2n-1)^{th}$ pixel row and a $2n^{th}$ pixel row are adjacently arranged, two adjacent first sub reset transistors are connected to each other through the third connection line, and the third connection line is electrically connected to the first reset signal line;

wherein the second sub reset transistors in the $2n^{th}$ pixel row and a $(2n+1)^{th}$ pixel row are adjacently arranged, two adjacent second sub reset transistors are connected to each other through the fourth connection line, and the fourth connection line is electrically connected to the second reset signal line, where n is a positive integer;

wherein the first reset signal line and the second reset signal line each extend along the first direction, the first reset signal line and the second reset signal line are arranged alternately, and the first reset signal line and the second reset signal line that are adjacent to each other are spaced by the drive transistors in one pixel row of the pixel rows;

wherein the first reset signal line is located between the drive transistors in the $(2n-1)^{th}$ pixel row and the $2n^{th}$ pixel row;

wherein the first reset signal line comprises a first breaking, and in the direction perpendicular to the plane where the display panel is located, the first breaking overlaps with the third connection line;

wherein the display panel comprises a second connection wire, the second connection wire is located at one side of the first reset signal line facing a light-exit surface of the display panel, the second connection wire is electrically connected to a part of the first reset signal line located at each of two sides of the first breaking through a third via-hole, the second connection wire is further electrically connected to the third connection line through a fourth via-hole, and in the direction perpendicular to the plane where the display panel is located, the fourth via-hole being located in the first breaking;

wherein the second reset signal line comprises a second breaking, and in the direction perpendicular to the plane where the display panel is located, the second breaking overlaps with the fourth connection line;

wherein the display panel comprises a third connection wire, the third connection wire is located at one side of the second reset signal line facing a light-exit surface of the display panel, the third connection wire is electrically connected to a part of the second reset signal line located at each of two sides of the second breaking through a fifth via-hole, the third connection wire is further electrically connected to the fourth connection line through a sixth via-hole, and in the direction perpendicular to the plane where the display panel is located, the sixth via-hole is located in the second breaking;

wherein the display panel comprises a first auxiliary reset signal line extending along the second direction, and the first auxiliary reset signal line is electrically connected to the first reset signal line; and wherein the display panel comprises a second auxiliary reset signal line extending along the second direction, and the second auxiliary reset signal line is electrically connected to the second reset signal line;

wherein the light-emitting elements comprise a red light-emitting element, a green light-emitting element, and a blue light-emitting element; and the anodes comprise a first anode at the red light-emitting element, a second anode at the green light-emitting element, and a third anode at the blue light-emitting element;

wherein the display panel comprises a first anode group and a second anode group arranged alternately along the first direction; wherein the first anode group comprises anode units arranged along the second direction, the anode units each comprises one first anode and one second anode, and the first anodes or the second anodes in two adjacent anode units are adjacent to each other; and wherein the second anode group comprises third anodes arranged along the second direction;

wherein each pixel row of the pixel rows corresponds to one first connection signal line, and two adjacent pixel rows and two first connection signal lines correspond corresponding thereto are symmetric about a first symmetry axis, respectively; and wherein in the direction perpendicular to the plane where the display panel is located, one of the first anode or the second anode overlaps with the first connection signal line.

10. The display panel according to claim 1, wherein at least one of the second connection signal lines comprises a first sub connection line segment and a second sub connection line segment arranged along the second direction, a breaking is formed between the first sub connection line segment and the second sub connection line segment, the first sub connection line segment is configured to receive a fixed voltage, and the second sub connection line segment is electrically connected to the first connection signal line; and wherein the light-emitting elements comprises a red light-emitting element, a green light-emitting element, and a blue light-emitting element, and in the direction perpendicular to the plane where the display panel is located, the anode of at least one of the green light-emitting element overlaps with the first sub connection line segments in two adjacent second connection signal lines.

11. The display panel according to claim 1, wherein the pixel circuit group comprises a first pixel circuit group, the first pixel circuit group comprises two adjacent pixel circuits in two adjacent pixel columns;

wherein one of the pixel circuits comprises a threshold compensation transistor and a second light-emitting control transistor, the second light-emitting control transistor is electrically connected to the anode of the light-emitting element through an anode connection via-hole, wherein in a $(2n-1)^{th}$ pixel column and a $2n^{th}$ pixel column, the threshold compensation transistors are adjacent to each other, and the second light-emitting control transistors are adjacent to each other;

wherein two second connection signal lines are arranged between the $(2n-1)^{th}$ pixel column and the $2n^{th}$ pixel column;

wherein the threshold compensation transistor is electrically connected to the second light-emitting control transistor through a third semiconductor connection line, a part of two adjacent third semiconductor connection lines extending along the second direction is located between two adjacent second connection signal lines;

wherein the threshold compensation transistor comprises a first gate and a second gate; and wherein the second connection signal line is located between the first gate and the second gate of the threshold compensation transistor.

12. The display panel according to claim 1, wherein the pixel circuit group comprises a first pixel circuit group, and the first pixel circuit group comprises two adjacent pixel circuits in two adjacent pixel columns;

wherein the second connection signal line comprises a first sub connection line segment and a second sub connection line segment arranged along the second direction, a breaking is formed between the first sub connection line segment and the second sub connection line segment, the first sub connection line segment is configured to receive a fixed voltage, and the second sub connection line segment is electrically connected to the indirect-connection signal line;

wherein one of the pixel circuits comprises a second light-emitting control transistor, the second light-emitting control transistor is electrically connected to the anode of one of the light-emitting elements through an anode connection via-hole, wherein the second light-emitting control transistors in a $(2n-1)^{th}$ pixel column and a $2n^{th}$ pixel column are adjacent to each other; and wherein in the second connection signal line, a distance between the first sub connection line segment and the anode connection via-hole is smaller than a distance between the second sub connection line segment and the anode connection via-hole.

13. The display panel according to claim 1, wherein the indirect-connection signal line is electrically connected to the first connection signal line through a first connection via-hole, and the first connection signal line is electrically connected to the second connection signal line through a second connection via-hole; and wherein in the direction perpendicular to the plane where the display panel is located, at least part of the anodes overlaps with at least two first structures, the at least two first structures are located at one side of the anodes facing away from a light-exit surface of the display panel, the at least two first structures each comprise the second connection via-hole and a pad metal, wherein a width of the pad metal in the second direction is greater than a line width of the first connection signal line, and a width of the pad metal in the first direction is greater than a line width of the second connection signal line.

14. The display panel according to claim 13, wherein the second connection signal lines comprise a first-type second connection signal line and a second-type second connection signal line adjacent to each other, and each of the first-type second connection signal line and the second-type second connection signal line is electrically connected to a same first connection signal line through the second connection via-hole; and wherein in the direction perpendicular to the plane where the display panel is located, part of the anodes overlaps with the second connection via-hole connected to the first-type second connection signal line and the second-type second connection signal line.

15. The display panel according to claim 13, wherein in the direction perpendicular to the plane where the display panel is located, part of the anodes overlaps with the second connection via-hole and the pad metal, or wherein in the direction perpendicular to the plane where the display panel is located, part of the anodes does not overlap with the second connection via-hole and overlaps with the pad metal.

16. The display panel according to claim 13, wherein the pad metal comprises a first metal pad and a second metal pad, the first metal pad is arranged in a same layer as the second connection signal line, and the second metal pad is arranged in a same layer as the first connection signal line.

17. The display panel according to claim 13, wherein in the direction perpendicular to the plane where the display panel is located, the anode has a symmetric structure about a second symmetry axis, the anode is divided into a first part and a second part by the second symmetry axis, and a number of the first structures overlapping with the first part is equal to a number of the first structures overlapping with the second part;

wherein in the direction perpendicular to the plane where the display panel is located, the anode has a symmetric structure about a second symmetry axis, and orthographic projections of the at least two first structures overlapping with the anode are symmetric about the second symmetry axis; and wherein a number of the first structures overlapping with the anode is m, where $m \geq 4$.

18. The display panel according to claim 1, wherein one of the pixel circuits comprises a second light-emitting control transistor, and the second light-emitting control transistor is electrically connected to the anode of one of the light-emitting elements through an anode connection via-hole;

wherein the display panel comprises pixel rows arranged along the second direction, and each pixel row of the pixel rows comprises pixel circuits arranged along the first direction; wherein the pixel circuit group comprises a second pixel circuit group, the second pixel circuit group comprises two adjacent pixel circuits in two adjacent pixel rows; and wherein the second light-emitting control transistors in a $2n^{th}$ pixel row and a $(2n+1)^{th}$ pixel row are adjacently arranged, where n is a positive integer; and wherein the indirect-connection signal line is electrically connected to the first connection signal line through a first connection via-hole, the first connection signal line is electrically connected to the second connection signal line through a second connection via-hole, the second connection via-hole is close to a junction of a $(2n-1)^{th}$ pixel row and the $2n^{th}$ pixel row, and in the direction perpendicular to the plane where the display panel is located, at least part of the anodes does not overlap with the second connection via-hole.

19. The display panel according to claim 1, wherein the first signal lines comprise a first-type first signal line, and in the first-type first signal line, the indirect-connection signal line is located at each of two sides of the direct-connection signal line in the first direction, and the second connection signal line connected to the indirect-connection signal line is located at one side of the indirect-connection signal line close to the direct-connection signal line; and wherein the first signal lines comprise at least one of a data line or a power signal line.

20. A display device, comprising:

a display panel, wherein the display panel has a display region;

pixel circuits located in the display region, each of the pixel circuits comprising a drive transistor and a first reset transistor that is electrically connected to a reset signal line;

first signal lines located in the display region, the first signal lines comprising an indirect-connection signal line and a direct-connection signal line;

connection signal lines located in the display region, at least part of the connection signal lines being electrically connected to the indirect-connection signal line, the connection signal lines comprising a first connection signal line extending along a first direction and a second connection signal line extending along a second direction, the second direction intersecting the first direction;

light-emitting elements located in the display region, each of the light-emitting elements comprising an anode;

a pixel circuit group, the pixel circuit group comprising two pixel circuits at least partially symmetric with and adjacent to each other, and the first reset transistors of the two pixel circuits in the pixel circuit group being adjacent to each other and being connected to each other through a first semiconductor connection line, the first semiconductor connection line being connected to the reset signal line; and pixel columns arranged along the first direction, each pixel column of the pixel columns comprising pixel circuits arranged along the second direction, two sides of the drive transistors in one pixel column of the pixel columns in the first direction being provided with two first signal lines and two second connection signal lines, and in a direction perpendicular to a plane where the display panel is located, at least one of the anodes overlapping with two adjacent first signal lines, or at least one of the anodes overlapping with two adjacent second connection signal lines, or at least one of the anodes overlapping with two adjacent first signal lines while at least another one of the anodes overlapping with two adjacent second connection signal lines, wherein an opening is formed in the display region; and wherein the first signal lines comprise a second-type first signal line, and in the second-type first signal line, part of the indirect-connection signal lines is located at each of two sides of the opening in the first direction and are electrically connected to each other through a connection signal line.

* * * * *